(12) United States Patent
Xia et al.

(10) Patent No.: US 12,549,105 B2
(45) Date of Patent: Feb. 10, 2026

(54) NON-ISOLATED DC/DC POWER CONVERTER AND POWER CONVERSION APPARATUS

(71) Applicant: Delta Electronics (Shanghai) Co.,Ltd., Shanghai (CN)

(72) Inventors: Litao Xia, Shanghai (CN); Xinmin Bai, Shanghai (CN); Jinfa Zhang, Shanghai (CN); Bo Wen, Shanghai (CN); Zhiyu Shen, Shanghai (CN); Peter Mantovanelli Barbosa, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 210 days.

(21) Appl. No.: 18/237,143

(22) Filed: Aug. 23, 2023

(65) Prior Publication Data
US 2025/0070672 A1    Feb. 27, 2025

(51) Int. Cl.
*H02M 3/158*    (2006.01)
*H02M 1/15*    (2006.01)

(52) U.S. Cl.
CPC .......... *H02M 3/1584* (2013.01); *H02M 1/15* (2013.01)

(58) Field of Classification Search
CPC .......................................... H02M 3/155–1588
See application file for complete search history.

(56) References Cited

U.S. PATENT DOCUMENTS

| | | | |
|---|---|---|---|
| 5,548,165 A | | 8/1996 | Mohan et al. |
| 5,932,995 A | * | 8/1999 | Wagoner ............... H02M 3/158 323/222 |
| 10,594,207 B2 | | 3/2020 | Li et al. |

(Continued)

FOREIGN PATENT DOCUMENTS

| | | |
|---|---|---|
| CN | 107482892 | 1/2020 |
| CN | 110120752 | 4/2021 |

(Continued)

OTHER PUBLICATIONS

Xin Zhang et al., Adaptive Active Capacitor Converter for Improving Stability of Cascaded DC Power Supply System, IEEE Transactions on Power Electronics, vol. 28, No. 4, Apr. 2013.

(Continued)

*Primary Examiner* — Peter M Novak
(74) *Attorney, Agent, or Firm* — CKC & Partners Co., LLC

(57) ABSTRACT

The invention discloses a non-isolated DC/DC power converter and a power conversion apparatus. The non-isolated DC/DC power converter comprises a power module comprising a first power conversion circuit, the first power conversion circuit being a non-isolated DC/DC conversion circuit, a first output end of the first power conversion circuit is connected with a first inductor, and a second output end of the first power conversion circuit is connected with a second inductor; and an oscillation suppression module comprising a second power conversion circuit, a first terminal of the second power conversion circuit coupled in parallel to an input end of the first power conversion circuit, a first terminal current of the second power conversion circuit being in phase with at least partial of AC components of an input voltage of the oscillation suppression module, and the second power conversion circuit being a bidirectional DC/DC conversion circuit.

2 Claims, 28 Drawing Sheets

(56) References Cited

U.S. PATENT DOCUMENTS

| | | |
|---|---|---|
| 2002/0043968 A1 | 4/2002 | Cheng et al. |
| 2015/0155772 A1 | 6/2015 | DeSousa |
| 2016/0301387 A1 | 10/2016 | Wang et al. |
| 2017/0155314 A1 | 6/2017 | Franchino |
| 2019/0229609 A1* | 7/2019 | Li .............................. H02J 1/02 |
| 2022/0052609 A1* | 2/2022 | Vinciarelli ........ H02M 3/33561 |

FOREIGN PATENT DOCUMENTS

| | | |
|---|---|---|
| CN | 110277901 | 12/2021 |
| CN | 114448251 | 5/2022 |
| CN | 112865521 | 3/2023 |
| DE | 102005041936 A1 | 3/2007 |

OTHER PUBLICATIONS

Tam K.T. Nguyen et al., Evaluation of Active Capacitor Bank for Floating H-bridge Power Modules, IEEE, 2020.

Hojoon Shin et al., Grid Current Shaping Method with DC-Link Shunt Compensator for Three-Phase Diode Rectifier-Fed Motor Drive System, IEEE Transactions on Power Electronics, vol. 32, No. 2, Feb. 2017.

HIye-Jin Kim, et al., Large-Signal Stability Analysis of DC Power System With Shunt Active Damper, IEEE Transactions on Industrial Electronics, vol. 63, No. 10, Oct. 2016.

Hongyan Zhou, et al., Stability Analysis of Three-Port Cascaded Inverter System With Second Harmonic Current Suppression, IEEE Access, Received Feb. 7, 2023, accepted Apr. 5, 2023, date of publication Apr. 10, 2023, date of current version Apr. 27, 2023.

Zhenyu Shan et al., Transient Mitigation Using an Auxiliary Circuit in Cascaded DC-DC Converter Systems With Virtual Impedance Control, IEEE Transactions on Industrial Electronics, vol. 69, No. 5, May 2022.

* cited by examiner

NON-ISOLATED DC/DC POWER CONVERTER AND POWER CONVERSION APPARATUS

BACKGROUND OF THE INVENTION

1. Field of the Invention

The invention relates to the field of power electronic technology, and particularly to a non-isolated DC/DC power converter and a power conversion apparatus.

2. Related Art

In actual application, large power non-isolated DC/DC power converters often have a plurality of DC/DC power conversion modules with outputs connected in parallel to increase an output power, and inputs coupled to reduce the number of input wirings. Currently, the DC/DC power conversion modules often use a two-stage architecture (such as, PFC+Buck).

If the architecture of the DC/DC power conversion modules is changed from two-stage to single-stage, it is possible to significantly improve efficiency and reduce cost, the conversion modules with a single-stage architecture having a load with constant power have at least one of the problems, such as, current oscillation at the input side of the single-stage conversion modules during system disturbance, or current circulation between a plurality of single-stage conversion modules connected in parallel.

FIG. 1 shows a DC/DC power conversion module 10 using a single-stage architecture, including an input power supply Vin and a Buck circuit 11, and equivalent or external connected inductor L_in and capacitor C_in are settled between the input power supply Vin and the Buck circuit 11. Since the Buck circuit 11 is equivalent as a constant power load, current oscillation at an input terminal of the Buck circuit 11 will be caused during operation, in particular, the situation of the sudden change of the load or input power. An approach known by the inventor is to connect a passive damping circuit formed by RC in parallel in the input terminal of the Buck circuit, but the passive damping circuit causes a great power loss.

In addition, there is current circulation between a plurality of modules which their inputs and outputs are connected in parallel. As shown by an arrow direction in FIG. 2, partial current I_A1 of a current I_A of the first DC/DC power conversion module 21 flows back from its negative end, partial current I_A2 flows back from a negative end of the second DC/DC power conversion module 22, and amplitudes of the currents I_A1 and I_A2 are associated with the equivalent impedances of the two paths. I_A2 is the current circulation between the modules, causing non-uniformity of current between the modules, such that power of the modules is non-uniform, and heat of the modules is non-uniform.

Therefore, it is urgent to provide an improved DC/DC power conversion module with a single-stage structure, which overcomes the problems of current oscillation and current circulation between the modules, achieves high efficiency and low cost of the DC/DC power conversion modules, is applied to a medium voltage input DC power system, and may be suitable for more different voltage application scenarios through different connection schemes, thereby reducing cost of the system while improving reliability of the power system.

SUMMARY OF THE INVENTION

An object of the present disclosure is to provide a non-isolated DC/DC power converter and a power conversion unit, which can solve one or more deficiencies in the prior art.

In order to achieve the object, the present disclosure provides a non-isolated DC/DC power converter, including: a power module including a first power conversion circuit, the first power conversion circuit being a non-isolated DC/DC conversion circuit, a first output end of the first power conversion circuit is connected with a first inductor, and a second output end of the first power conversion circuit is connected with a second inductor; and an oscillation suppression module including a second power conversion circuit, a first terminal of the second power conversion circuit coupled in parallel to an input end of the first power conversion circuit, a first terminal current of the second power conversion circuit being in phase with at least partial of AC components of an input voltage of the oscillation suppression module, and the second power conversion circuit being a bidirectional DC/DC conversion circuit.

In order to achieve the object, the present disclosure further provides a power conversion apparatus, including N non-isolated DC/DC power converters and a rectifier, wherein the N DC/DC power converters have input terminals connected in parallel in connection with an output terminal of the rectifier and output terminals connected in parallel, where N is greater than or equal to 1.

The present disclosure provides a non-isolated DC/DC power converter and a power conversion apparatus, which overcomes the problems of current oscillation and current circulation between the modules, achieves high efficiency and low cost of the non-isolated DC/DC power converter, is particularly applied to a medium voltage input DC power system of the data center, and may be suitable for more different voltage application scenarios through different connection schemes, thereby reducing cost of the system while improving reliability of the power system.

BRIEF DESCRIPTION OF THE DRAWINGS

To clearly explain the technical solution implemented by the present disclosure, hereinafter the accompanying drawings used in the embodiments are simply introduced.

Figure 1:
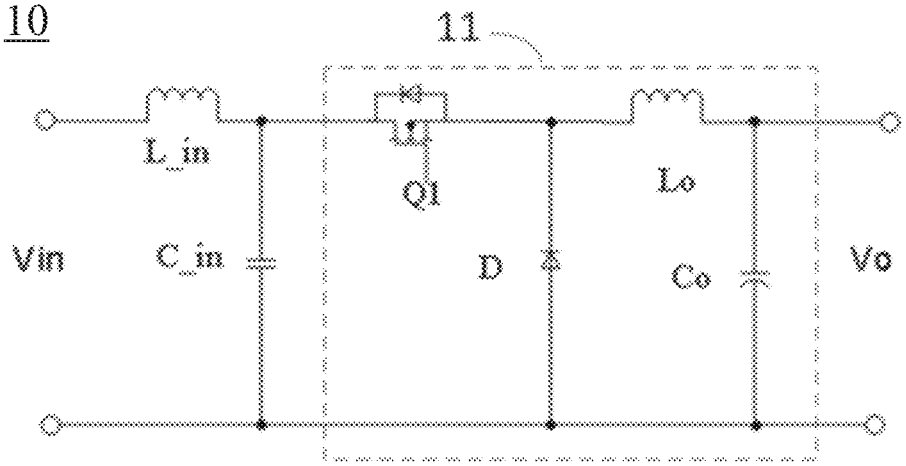
FIG. 1 is a structural diagram of a DC/DC power conversion module using a single-stage architecture in the prior art.
Figure 2:
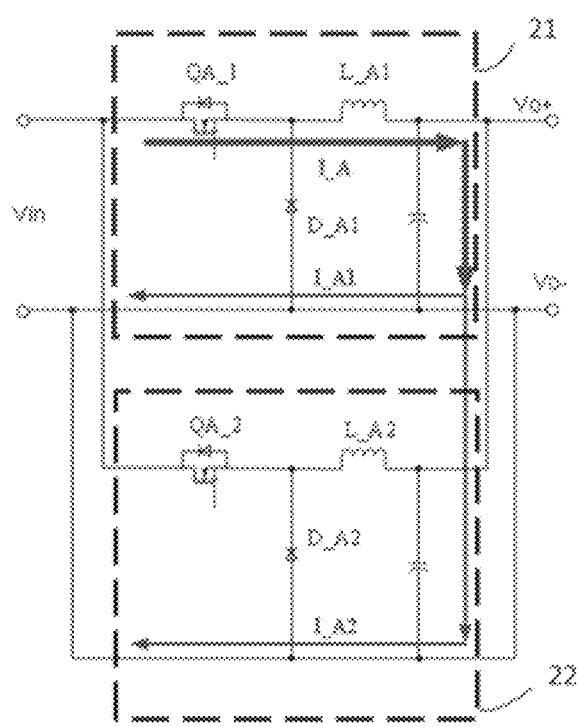
FIG. 2 is a schematic diagram of current direction after outputs of a plurality of DC/DC power conversion modules of FIG. 1 are connected in parallel.

Additional aspects and advantages of the present disclosure are partially explained in the below description, and partially become apparent from the description, or can be obtained from practice of the present disclosure.

DETAILED EMBODIMENTS OF THE INVENTION

The exemplary implementations will now be described more fully with reference to the accompanying drawings. However, the exemplary implementations can be implemented in various forms and should not be understood as being limited to the implementations set forth herein; on the contrary, these implementations are provided so that this present disclosure will be thorough and complete, and conception of the exemplary implementations will be fully conveyed to those skilled in the art.

When introducing the described and/or illustrated factors or constituent portions or the like, the words "one", "first", "the" and "at least one" represent one or more factors or constituent portions, or the like. The terms "comprise", "include" and "have" represent an open and including meaning, and refer to other factors or constituent portions, or the like, except listed factors or constituent portions, or the like. Moreover, the terms "first", "second" and the like in the claims are only used as signs, instead of limiting the numbers of the object. The same number in the drawings represents the same or similar assembly. On the other hand, the well-known assemblies and steps are not described in the embodiments in order to avoid unnecessary limit to the present disclosure. Moreover, for sake of simplifying the drawings, some known customary structures and elements are not illustrated in a simple way in the drawings.

Figure 3A:
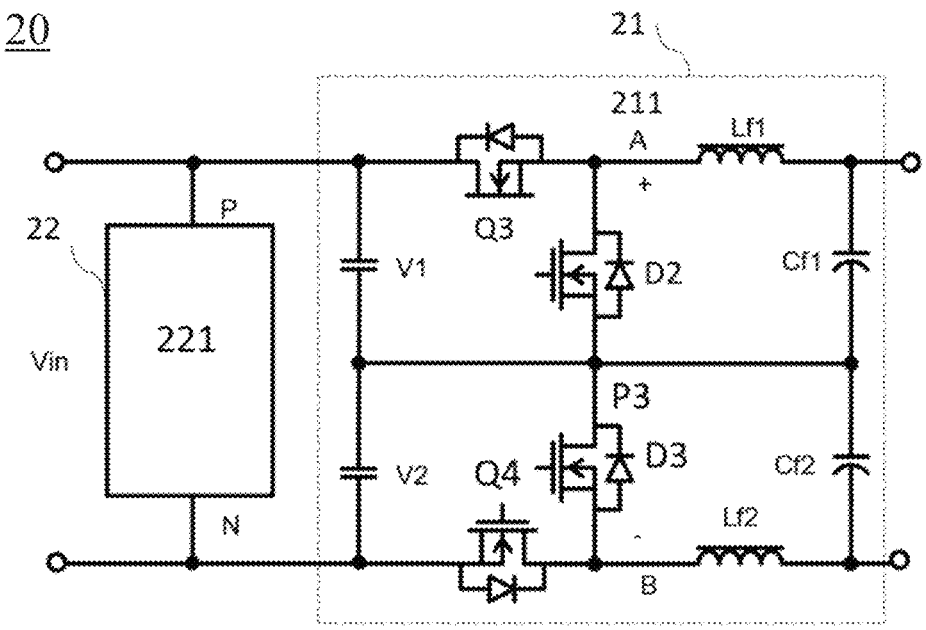
FIG. 3A is a structural diagram of a non-isolated DC/DC power converter in one embodiment of the present disclosure.

FIG. 3A is a structural diagram of a non-isolated DC/DC power converter 20 in one embodiment of the present disclosure. As shown in FIG. 3A, the non-isolated DC/DC power converter 20 includes a power module 21 and an oscillation suppression module 22, the power module 21 includes a first power conversion circuit 211, and the first power conversion circuit 211 is a non-isolated DC/DC conversion circuit, and has a first output end connected to a first inductor Lf1, and a second output end connected to a second inductor Lf2. The oscillation suppression module 22 has a first input end P and a second input end N, the first input end P and the second input end N having an input voltage Vin therebetween, and includes a second power conversion circuit 221, a first terminal of the second power conversion circuit 221 is connected in parallel to an input terminal of the first power conversion circuit 211, a first terminal current of the second power conversion circuit 221 is in phase with at least partial of AC components of an input voltage Vin of the oscillation suppression module 22, and the second power conversion circuit 221 may be a bidirectional DC/DC conversion circuit. It shall be noted that the first terminal current of the second power conversion circuit 221 is in phase with at least partial of AC components of the input voltage Vin of the oscillation suppression module 22, but phase error is allowed.

Figure 4:
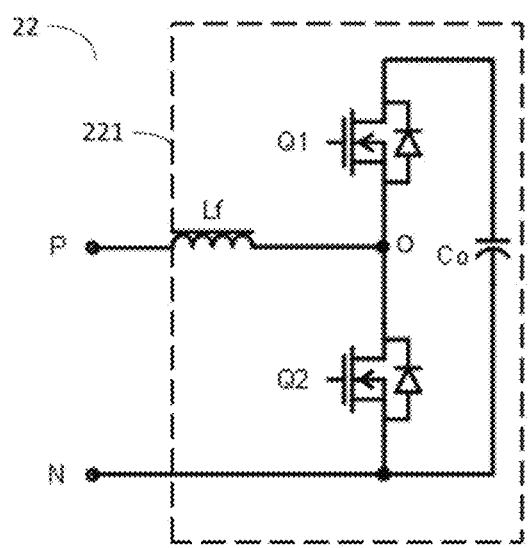
FIG. 4 is a structural diagram of an oscillation suppression module in one embodiment of the present disclosure.

FIG. 4 is a structural diagram of an oscillation suppression module 22 in one embodiment of the present disclosure. The oscillation suppression module 22 includes a second power conversion circuit 221, and the second power conversion circuit 221 may be a Boost circuit. In other embodiments, the second power conversion circuit 221 may be a directional DC/DC conversion circuit such as Buck, or Buck-Boost, but the present disclosure is not limited thereto. In this embodiment, the first terminal of the second power conversion circuit 221 includes a first end P and a second end N, the second power conversion circuit 221 includes a first switch Q1 and a second switch Q2, which have a node O therebetween, a third inductor Lf connected between the node O and the first end P, and a first capacitor Co, and the second terminal of the second power conversion circuit 221 includes the first capacitor Co connected in parallel to both ends of bridge arms of the first switch Q1 and the second switch Q2 connected in series.

Figure 5:
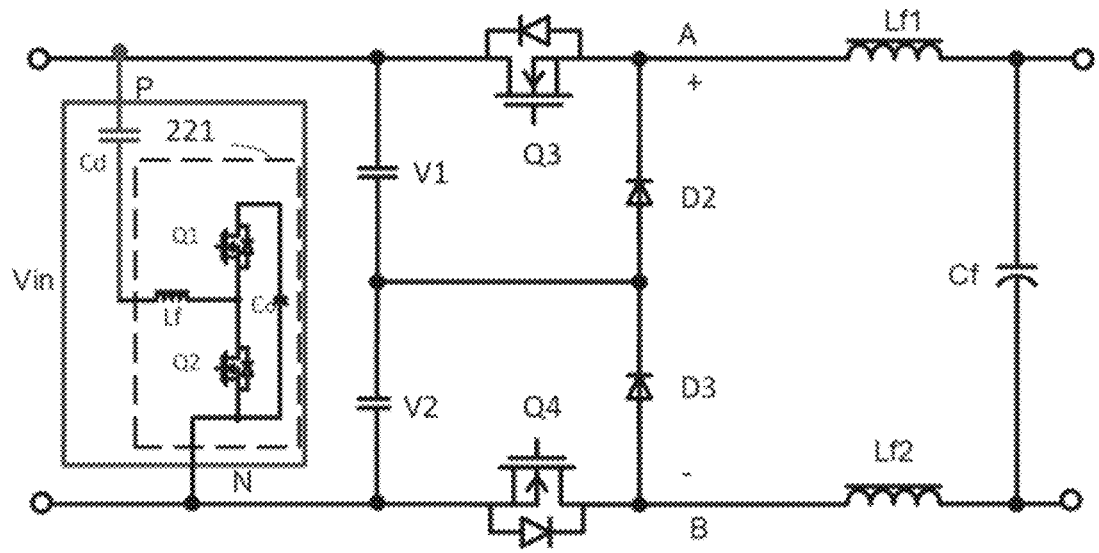
FIG. 5 is a structural diagram of an oscillation suppression module in another embodiment of the present disclosure.

Further, as shown in FIG. 5, the oscillation suppression module 22 may further include a blocking capacitor Cd having two ends connected to the first end P and the third inductor Lf respectively, and a voltage at the first terminal of the second power conversion circuit 221 may be reduced by connecting the blocking capacitor Cd and the second power conversion circuit 221 in series, thereby reducing a voltage stress on the switches of the second power conversion circuit, and further decreasing power loss of the second power conversion circuit 221. Moreover, the switches with low voltage withstand level may be selected, thus the cost of the oscillation suppression module is reduced.

Figure 3B:
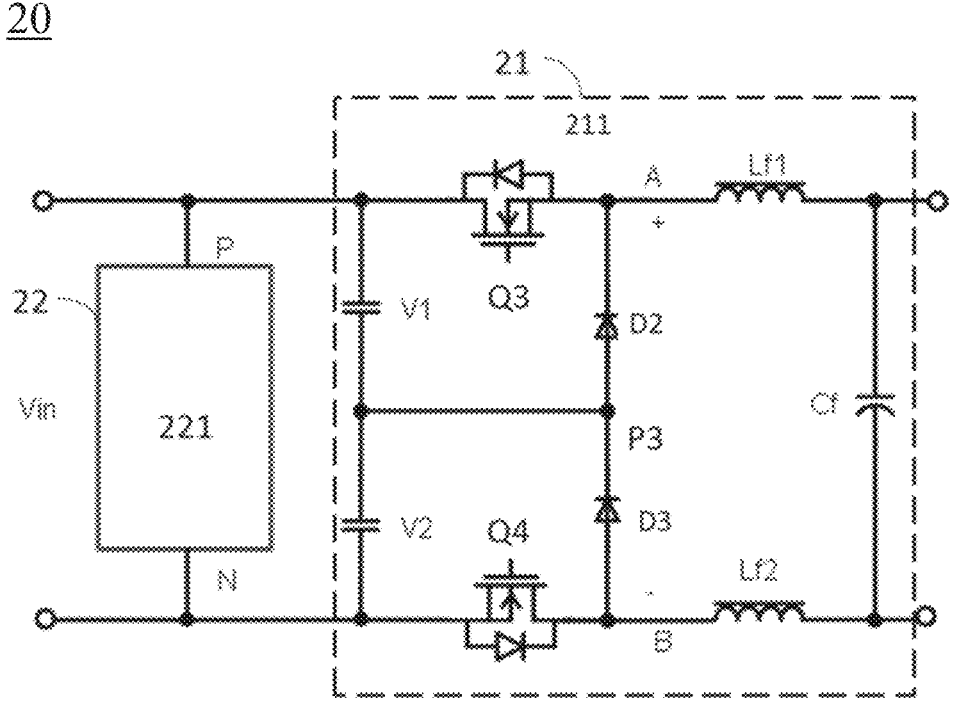
FIG. 3B is a structural diagram of a non-isolated DC/DC power converter in one embodiment of the present disclosure.

The first power conversion circuit 211 may be a three-level Buck conversion circuit. In one embodiment of FIG. 3A, the first power conversion circuit 211 includes a first bridge arm including a third switch Q3 and a fifth switch D2 connected in series, the third switch Q3 and the fifth switch D2 having a first output end A therebetween, and a second bridge arm including a fourth switch Q4 and a sixth switch D3 connected in series, the fourth switch Q4 and the sixth switch D3 having a second output end B therebetween, and the fifth switch D2 and the sixth switch D3 connected in series, and having a third node P3 therebetween. As shown in FIG. 3B, the fifth switch D2 and the sixth switch D3 may be diodes, but the present disclosure is not limited thereto. When the fifth switch D2 is a diode, a cathode of the fifth switch D2 is connected to the first output end A, and when the sixth switch D3 is a diode, an anode of the sixth switch D3 is connected to the second output end B. The first power conversion circuit 211 further includes a second capacitor V1 connected to both ends of the first bridge arm, and a third capacitor V2 connected to both ends of the second bridge arm. The first power conversion circuit 211 may further include a first inductor Lf1 having a first end connected in series to the first output end A, and a second inductor Lf2 having a first end connected in series to the second output end B. As compared to the DC/DC power conversion module 10 shown in FIG. 1, the first power conversion circuit 211 in this embodiment arranges first inductor Lf1 and second inductor Lf2 on a positive and a negative output of the first power conversion circuit respectively. The current flowing through negative output is reduced because of the second inductor Lf2, such that a positive current and a negative current at an output end of the first power conversion circuit are balanced when the plurality of first power conversion circuits are parallel connected, thereby effectively reducing current circulation between the modules. Moreover, when a magnetic assembly is designed, the first inductor Lf1 and the second inductor Lf2 may be combined as an integrated inductor, and cancellation of DC magnetic flux may be achieved by magnetic integration, thereby effectively decreasing a size of the inductor, and reducing manufacturing cost. The first power conversion circuit 211 further includes a fourth capacitor Cf connected in parallel to a second end of the first inductor Lf1 and a second end of the second inductor Lf2. In some embodiments, the voltage at both ends of the first bridge arm and the voltage at both ends of the second bridge arm may be set according to the actual application. When the voltages at the two ends of the first bridge arm and the voltages at the two ends of the second bridge arm are designed to be equal, the third switch Q3 and the fourth switch Q4 of the first power converter circuit 211 may use switches with identical characteristics, for example, switching devices with identical voltage withstand characteristics, which employ the same rated voltage between the drain and the source. It should be understood that a 50% error is allowed for the voltage at the ends of the first bridge arm to be equal to the voltage at the ends of the second bridge arm, and that the characteristic parameters of a switching device with identical voltage withstand characteristics are allowed to have an error of up to 50%, but the present disclosure is not limited thereto. In other embodiments, when the voltages at the ends of the first bridge arm and the voltages at the ends of the second bridge arm are designed to be unequal, i.e., the voltages at the ends of the second capacitance V1 and the third capacitance V2 are designed to be different, switches having different characteristics may also be used, e.g., the ratio between the voltages at the ends of the second capacitance V1 and the voltages at the ends of the third capacitance V2 with respect to each other may be set at an arbitrary value of between 1.5 and 10 times, but the present disclosure is not limited thereto. Specifically, the switch connected in parallel with the capacitor of lower voltage may adopt a switch with lower voltage withstand level, i.e., a switch with lower rated voltage between drain and source, and the switch connected in parallel with the capacitor of higher voltage may adopt a switch with higher voltage withstand level, i.e., a switch with higher rated voltage between drain and source, thereby fully utilizing the withstand voltages of the different switching devices, and reducing the loss and cost. Meanwhile, the selection of the characteristics of the fifth switch D2 and the sixth switch D3 may be adjusted accordingly to the characteristics of the corresponding third switch Q3 and the fourth switch Q4. The second capacitor V1 and the third capacitor V2 may use capacitors with different capacities or different rated voltages, but are not limited thereto.

Figure 6:
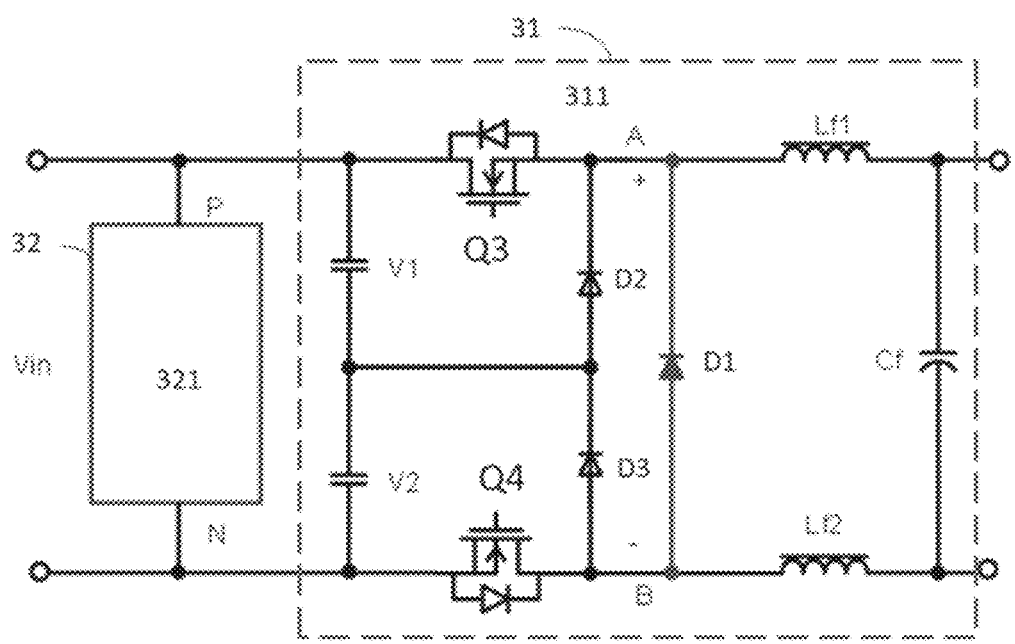
FIG. 6 is a structural diagram of a non-isolated DC/DC power converter in one embodiment of the present disclosure.

FIG. 6 shows a non-isolated DC/DC power converter 30 in another embodiment of the present disclosure. The non-isolated DC/DC power converter 30 includes a power module 31 and an oscillation suppression module 32, the oscillation suppression module 32 includes a second power conversion circuit 321, and the second power conversion circuit 321 may adopt the same as the second power conversion circuit 221 of FIG. 3B, but the present disclosure is not limited thereto. The power module 31 includes a first power conversion circuit 311, and the first power conversion circuit 311 differs from the first power conversion circuit 211 of FIG. 3B in that the first power conversion circuit 311 further includes a first diode D1, the anode of the first diode D1 connects to the second output end and the cathode of the first diode D1 connects to the first output end. The first diode D1 enables a current in the first inductor Lf1 and the second inductor Lf2 to flow through D1 when the third switch Q3 and the fourth switch Q4 are turned off simultaneously, and the power loss is reduced rather than a total loss when the current in the first inductor Lf1 and the second inductor Lf2 of the first power circuit flows through the fifth switch D2 and the sixth switch D3. The non-isolated DC/DC power converter of FIG. 6 may also work at a two-level mode. Since a sum of voltage drops on D2 and D3 is greater than a voltage drop on D1, D2 and D3 are always bypassed by D1. In some embodiments, the voltage at both ends of the first bridge arm and the voltage at both ends of the second bridge arm may be set according to the actual application. When the voltages at the two ends of the first bridge arm and the voltages at the two ends of the second bridge arm are designed to be equal, the third switch Q3 and the fourth switch Q4 of the first power converter circuit 211 may use switches with identical characteristics, for example, switching devices with identical voltage withstand characteristics, which employ the same rated voltage between the drain and the source. It should be understood that a 50% error is allowed for the voltage at the ends of the first bridge arm to be equal to the voltage at the ends of the second bridge arm, and that the characteristic parameters of a switching device with identical voltage withstand characteristics are allowed to have an error of up to 50%, but the present disclosure is not limited thereto. In other embodiments, when the voltages at the ends of the first bridge arm and the voltages at the ends of the second bridge arm are designed to be unequal, i.e., the voltages at the ends of the second capacitance V1 and the third capacitance V2 are designed to be different, switches having different characteristics may also be used, e.g., the ratio between the voltages at the ends of the second capacitance V1 and the voltages at the ends of the third capacitance V2 with respect to each other may be set at an arbitrary value of between 1.5 and 10 times, but the present disclosure is not limited thereto. Specifically, the switch connected in parallel with the capacitor of lower voltage may adopt a switch with lower voltage withstand level, i.e., a switch with lower rated voltage between drain and source, and the switch connected in parallel with the capacitor of higher voltage may adopt a switch with higher voltage withstand level, i.e., a switch with higher rated voltage between drain and source, thereby fully utilizing the withstand voltages of the different switching devices, and reducing the loss and cost. Meanwhile, the selection of the characteristics of the fifth switch D2 and the sixth switch D3 may be adjusted accordingly to the characteristics of the corresponding third switch Q3 and the fourth switch Q4. The second capacitor V1 and the third capacitor V2 may use capacitors with different capacities or different rated voltages, but are not limited thereto.

Figure 7A:
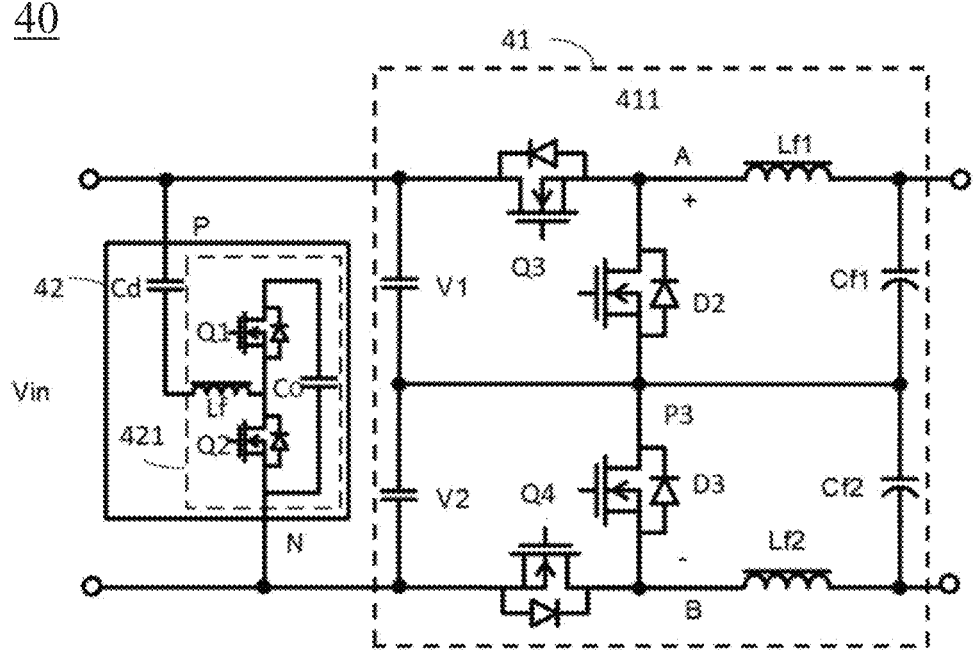
FIG. 7A is a structural diagram of a non-isolated DC/DC power converter in another embodiment of the present disclosure.
Figure 7B:
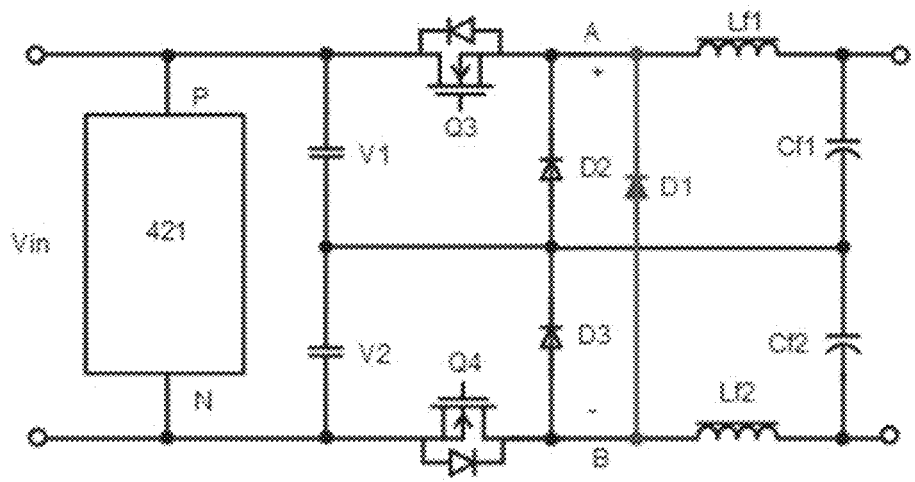
FIG. 7B is a structural diagram of a non-isolated DC/DC power converter in another embodiment of the present disclosure.

FIG. 7A shows a non-isolated DC/DC power converter 40 in another embodiment of the present disclosure. The non-isolated DC/DC power converter 40 includes a power module 41 and an oscillation suppression module 42, the oscillation suppression module 42 includes a second power conversion circuit 421, and the second power conversion circuit 421 may adopt the same structure as the second power conversion circuit 221 of FIG. 3, but the present disclosure is not limited thereto. The power module 41 includes a first power conversion circuit 411, and the first power conversion circuit 411 uses a form of up and down Buck series connection. A structure of the first power conversion circuit 411 differs from the structure of the first power conversion circuit 211 of FIG. 3 in that in the first power conversion circuit 411, a fourth capacitor Cf is replaced by a first output capacitor Cf1 and a second output capacitor Cf2 connected in series, both ends of the first output capacitor Cf1 are connected to the first inductor Lf1 and the third node P3, respectively, and both ends of the second output capacitor Cf2 are connected to the second inductor Lf2 and the third node P3, respectively. Similar to the non-isolated DC/DC power converter 30 shown in FIG. 6, The fifth switch D2 and the sixth switch D3 may be diodes, but the present disclosure is not limited thereto. The non-isolated DC/DC power converter 40 may further include a first diode D1, as shown in FIG. 7B, the anode of the first diode D1 connects to the second output end and the cathode of the first diode D1 connects to the first output end.

Figure 8:
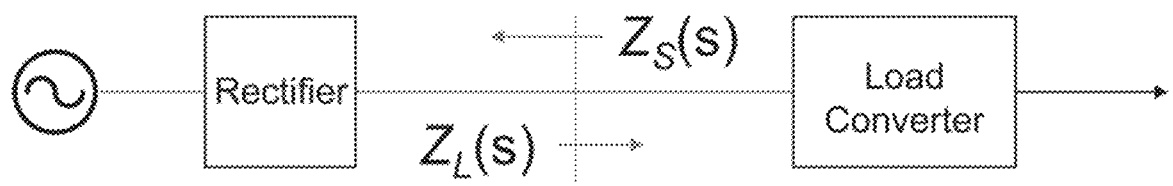
FIG. 8 is an equivalent diagram of a power conversion system including a power converter.
Figure 9:
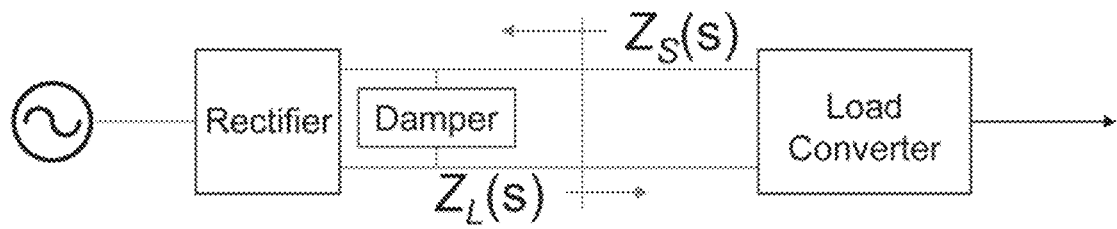
FIG. 9 is an equivalent diagram of a power conversion system including the non-isolated DC/DC power converter according to the present disclosure.
Figure 10:
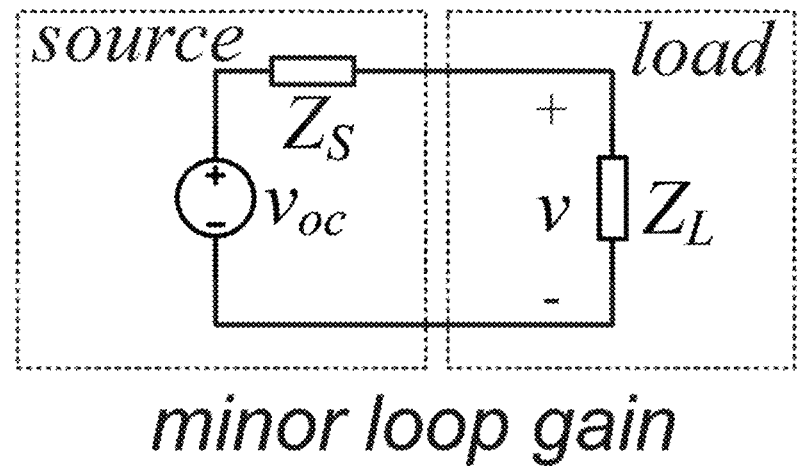
FIG. 10 is an equivalent circuit model of the power conversion system based on FIG. 9.
Figure 11:
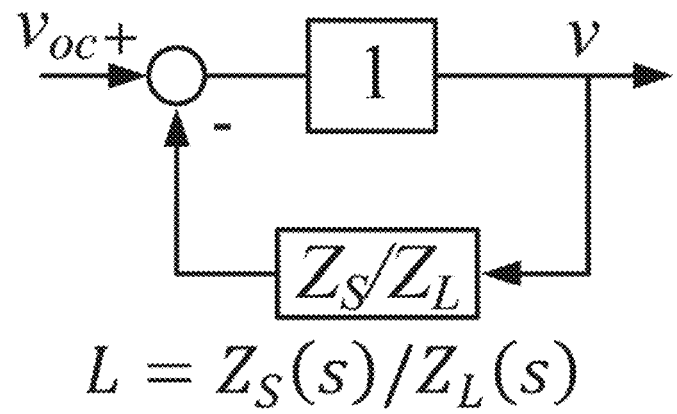
FIG. 11 is a frequency domain control model based on FIG. 10.
Figure 12:
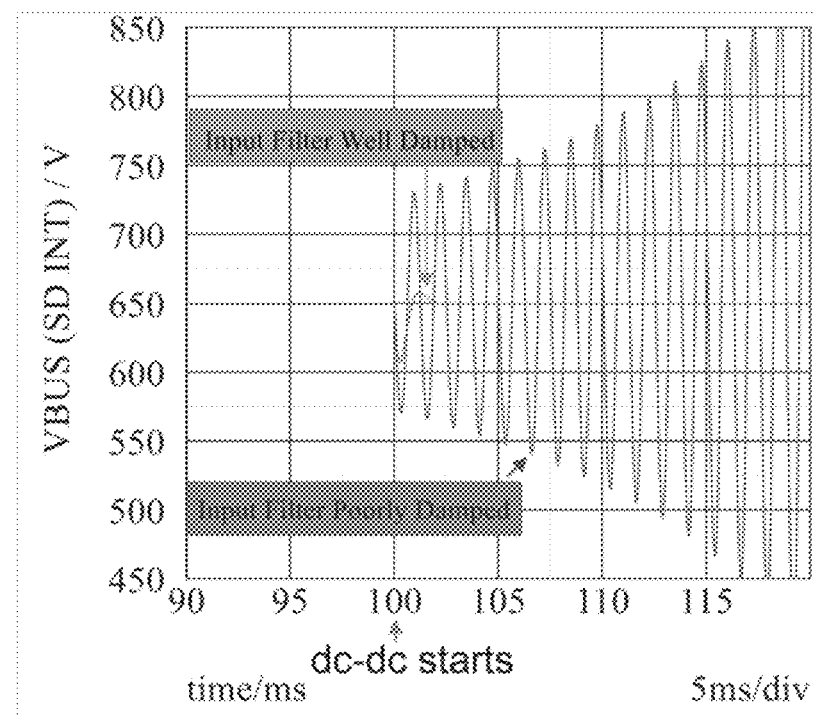
FIG. 12 is a simulation diagram of a voltage on a DC bus based on FIG. 10.

An input terminal of any non-isolated DC/DC power converter in the embodiment, included but not limited thereto, may be connected to an output terminal of any rectifier circuit, i.e., a DC bus, and the rectifier circuit is connected to an AC power supply to form a power conversion system. Since the tightly regulated load power converter, such as first power conversion circuit in the above mentioned embodiments, may be considered to be a constant power load (CPL) represented as an equivalent input impedance ZL(s), as shown in FIG. 8 Tightly regulated load power converters are constant power loads (CPLs) exhibiting a negative incremental resistance characteristic at their input impedance. As shown in FIG. 9, for example, a damper is added at the source side formed by the AC power supply and the rectifier circuit, and for example, an equivalent impedance at the source side of any second power conversion circuit in the embodiment is ZS(s). Instability and oscillation shown in FIG. 12 will occur at a DC bus or link of the source and the load if the power source side output impedance is not well damped according to the impedance-based analysis (equivalent circuit model shown in FIG. 10) and the Nyquist stability criterion based on the frequency domain control model shown in FIG. 11.

Figure 13:
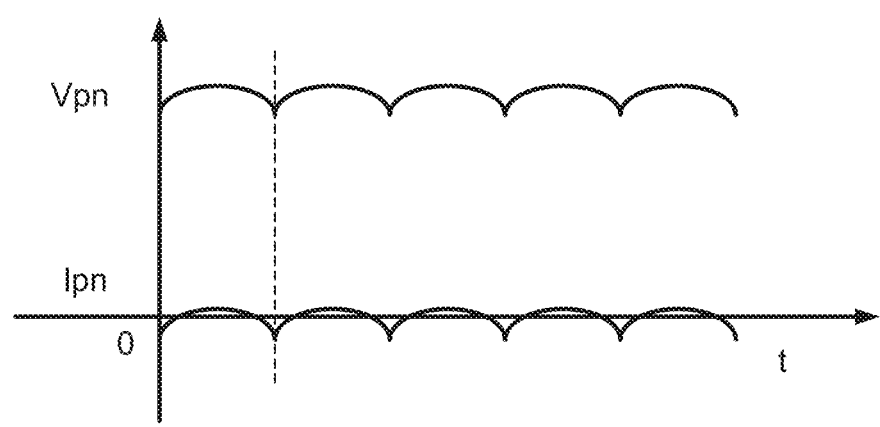
FIG. 13 is a schematic diagram of a control embodiment of the oscillation suppression module of the present disclosure.

FIG. 13 is a control diagram of a first controller in the oscillation suppression module 22 of FIG. 3. The first controller controls a first terminal current Ipn of the second power conversion circuit 221 of the oscillation suppression module 22 to have the same phase as the waveform of the at least partial AC components of the input voltage Vpn, thus the second power conversion circuit 221 in operation shows the characteristic of resistance at the frequency of at least one of the AC components of the input voltage Vpn to suppress oscillation of an input current of the first power conversion circuit 211. It shall be noted, that the first terminal current Ipn of the second power conversion circuit 221 is in phase with the at least partial AC components of the input voltage Vpn shall be considered that an error by leading or lagging error behind of 30° is allowed.

Figure 14:
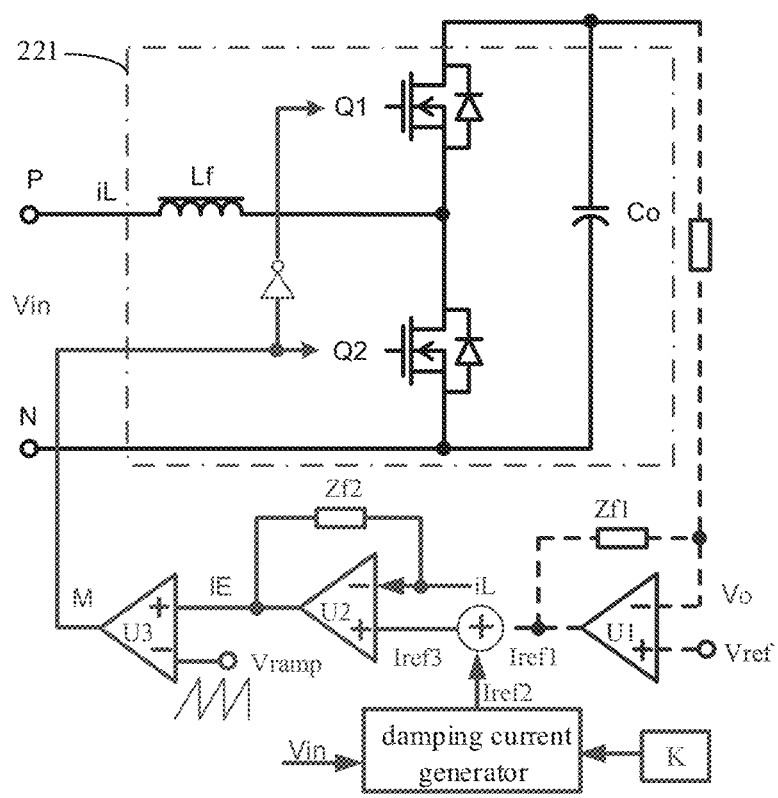
FIG. 14 is a schematic diagram of a control embodiment of the oscillation suppression module of FIG. 4.

FIG. 14 is a control diagram of a first controller in the oscillation suppression module 22 of FIG. 4, where a dotted portion shown in FIG. 14 is a voltage control loop, and a solid portion shown in FIG. 14 is a current control loop, including a voltage loop regulator U1, a current loop regulator U3, a first calculator U2 and a damping current generator. The voltage loop regulator U1 outputs a first reference current Iref1 according to a second terminal voltage Vo at the second terminal of the second power conversion circuit and a first reference voltage Vref1 of the second power conversion circuit 221. The damping current generator outputs a second reference current Iref2 according to an input voltage Vin at the input terminal of the oscillation suppression module, and a first coefficient k, where the first coefficient k may be a certain value, or may be regulated according to an impedance of the power conversion system. A multiplier outputs a third reference current Iref3 according to the first reference voltage Vref1 and the second reference current Iref2, such that a waveform of Iref3 follows a waveform of at least one AC component Vin' of the input voltage Vin at the first terminal of the oscillation suppression module. The current loop regulator outputs a driving signal M according to third inductor current iL flowing through the third inductor and the third reference current Iref3 of the second power conversion circuit 221, for example, using an modulator U3 to obtain the driving signal M according an error amplification signal IE and a triangular wave Vramp, the error amplification signal IE is obtained by U2 and according to the third inductor current iL and the third reference current Iref3. The duty ratios of the first switch Q1 and the second switch Q2 are regulated according to the driving signal M. Thus the current iL of the third inductor is controlled to avoid oscillation of the input current. Q1 and Q2 are complementarily turned on, and remain a dead zone.

Figure 15:
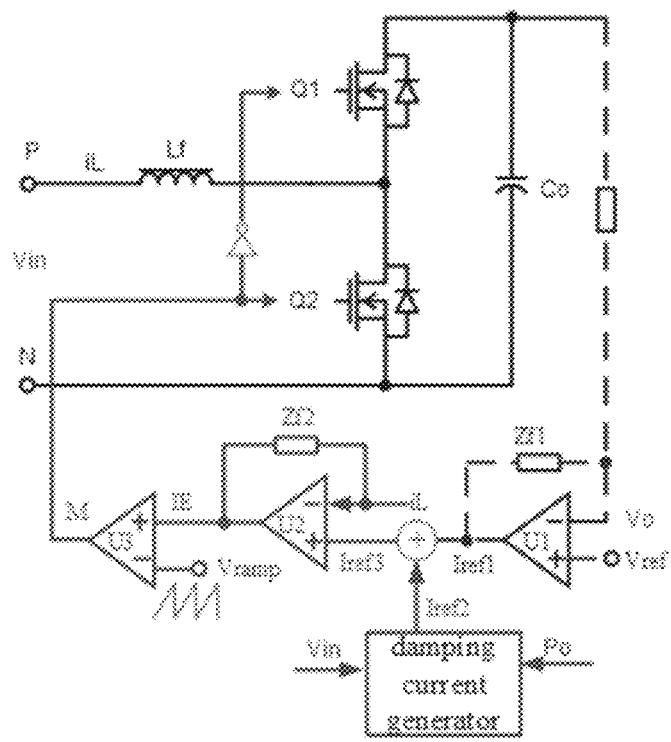
FIG. 15 is a schematic diagram of another control embodiment of the oscillation suppression module of FIG. 4.

In some other embodiments, the difference from the control embodiment of FIG. 14 is that the second reference current Iref2 is determined together by the input voltage Vin and an output power Po of the first power conversion circuit. As shown in FIG. 15, the damping current generator may also output the second reference current Iref2 according to the input voltage Vin of the second power conversion circuit 221 and the output power Po of the first power conversion circuit 211.

It shall be noted that implementation of U1, U2 and U3 may use analog or digital control or a mixture thereof. In addition, when the second power conversion circuit 221 is a bidirectional DC/DC conversion circuit such as Buck, or Buck-Boost, control concept of the first controller is similar with the above control concept, and the details are not described here.

Figure 16:
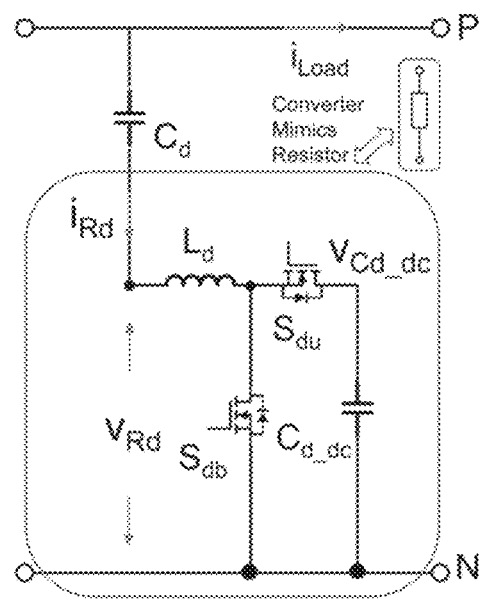
FIG. 16 is a schematic diagram of the oscillation suppression module of FIG. 5.
Figure 17:
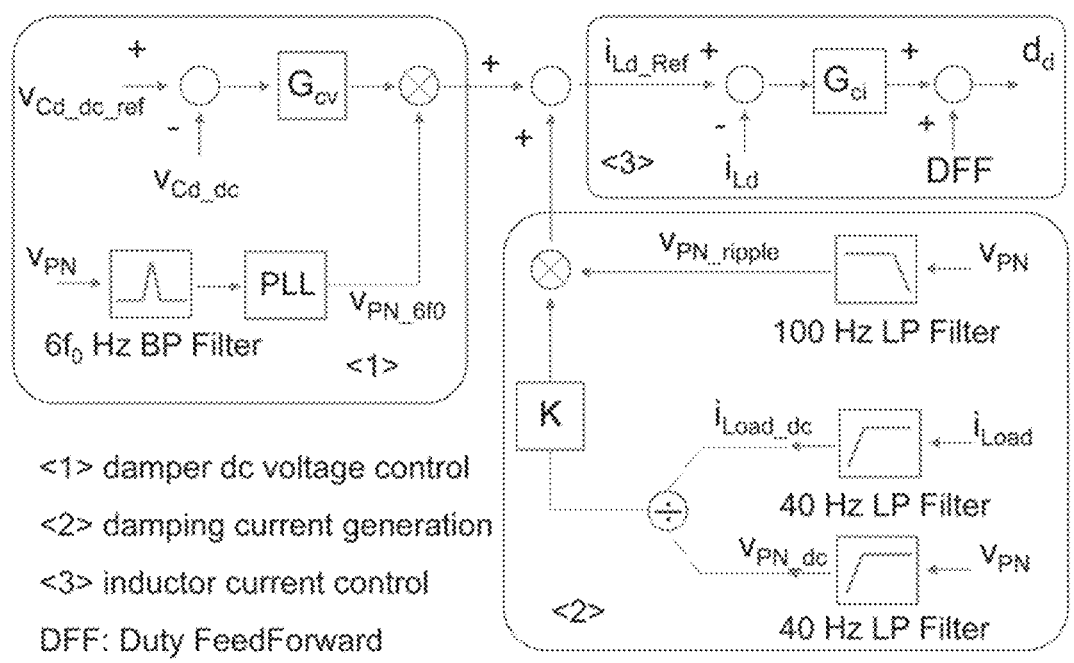
FIG. 17 is a schematic diagram of another control embodiment of the oscillation suppression module of FIG. 5.
Figure 18A:
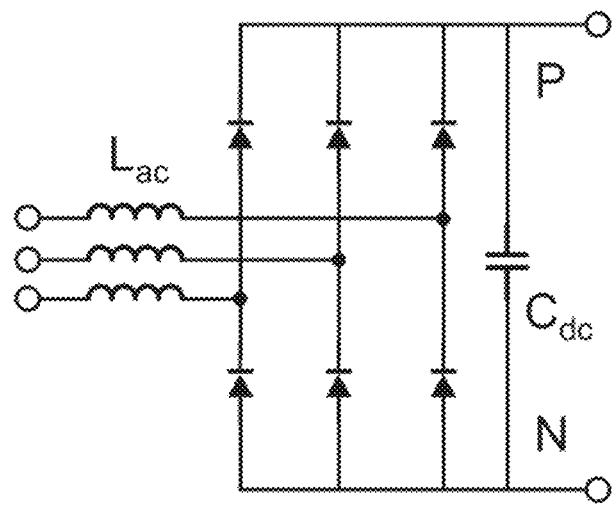
FIG. 18A is a schematic diagram of a three-phase rectifier circuit.
Figure 18B:
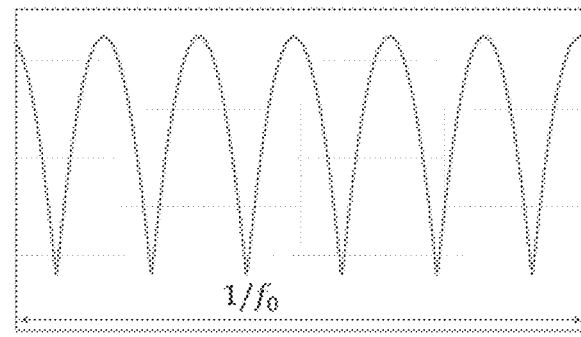
FIG. 18B is a schematic diagram of an output waveform of the three-phase rectifier circuit as shown in FIG. 18A.
Figure 18C:
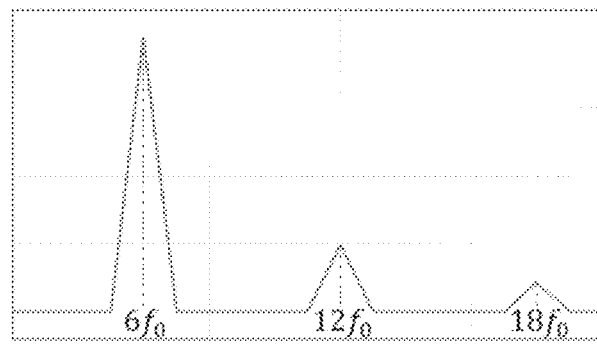
FIG. 18C is a schematic diagram of the main AC harmonic components of the output voltage of the three-phase rectifier.
Figure 19A:
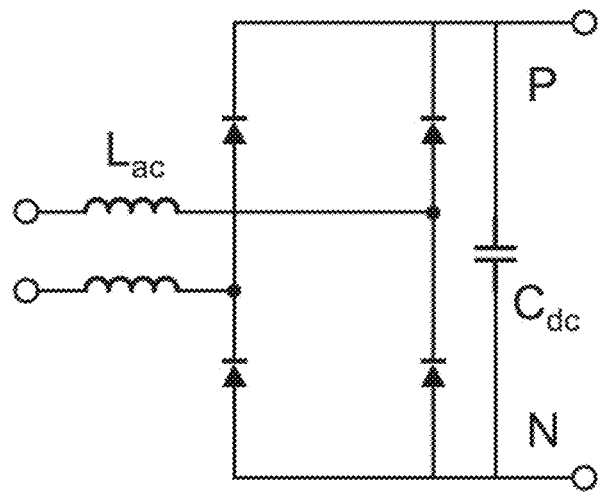
FIG. 19A is a schematic diagram of a single-phase diode rectifier circuit.
Figure 19B:
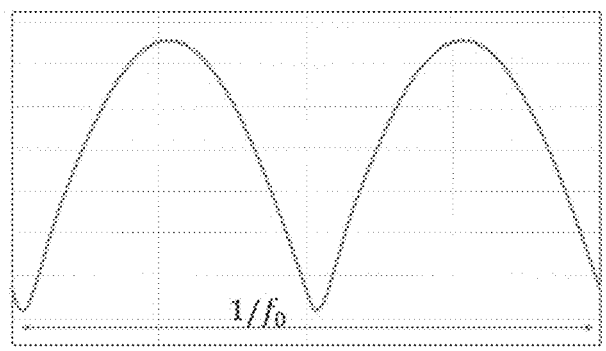
FIG. 19B is a schematic diagram of a output waveform of the single-phase diode rectifier circuit as shown in FIG. 19A.
Figure 19C:
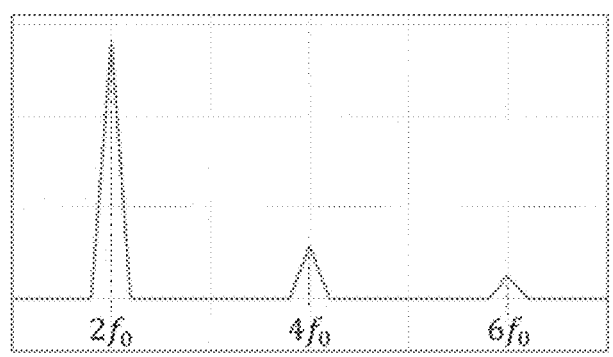
FIG. 19C is a schematic diagram of the main AC harmonic components of the output voltage of the single-phase diode rectifier.
Figure 20A:
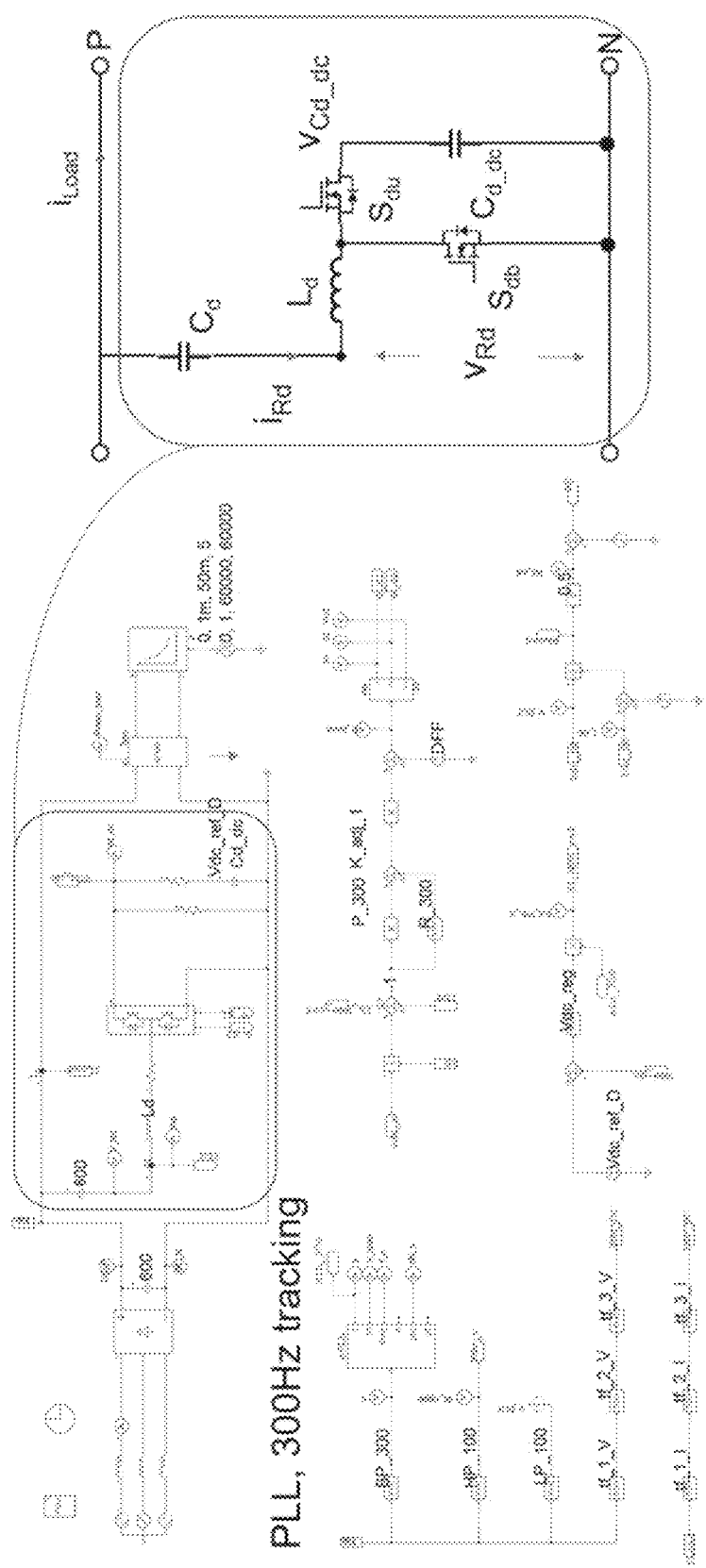
FIG. 20A is a simulation model of computer simulation based on the control embodiment of FIG. 17.
Figure 20B:
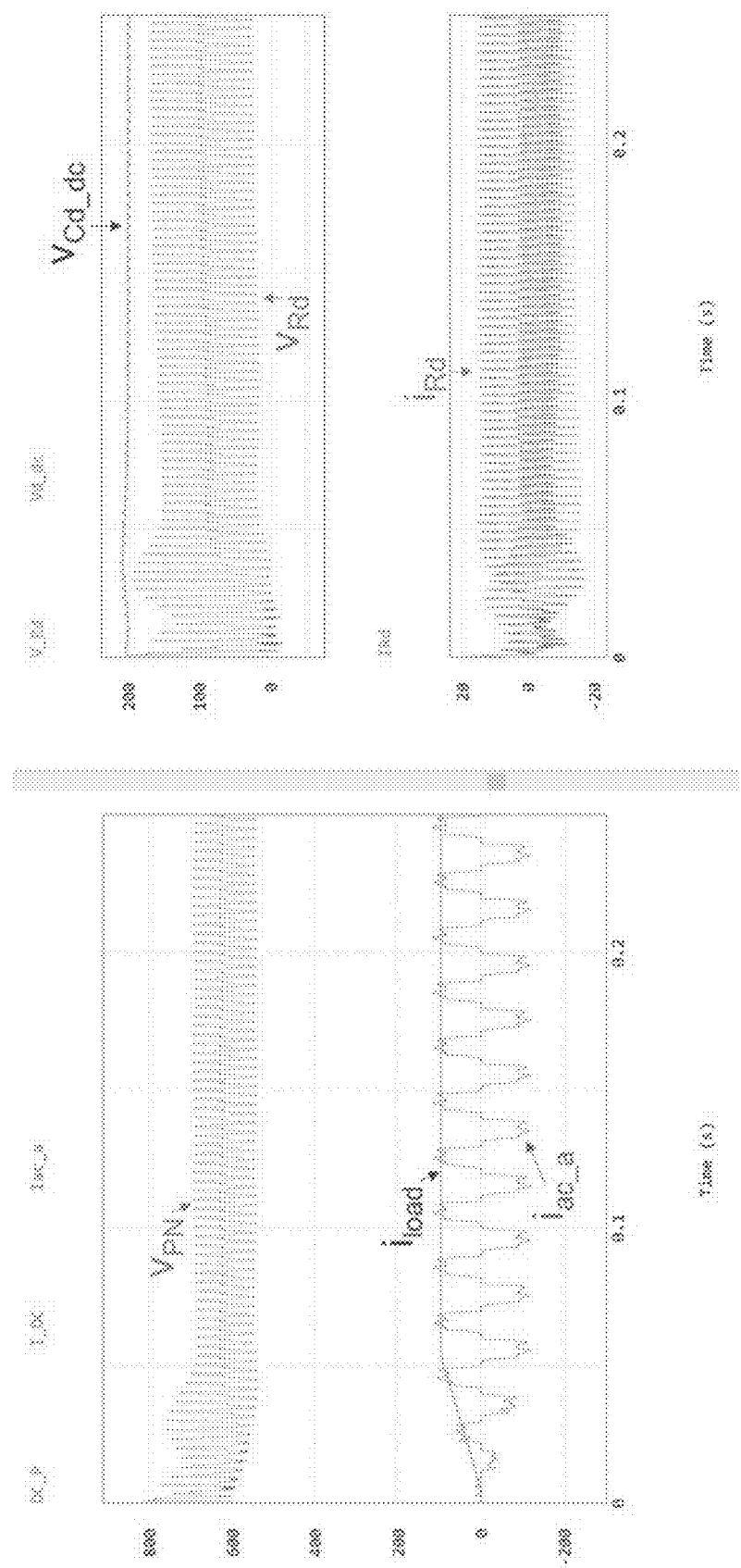
FIG. 20B is results of simulation based on the simulation model of FIG. 20A.

In still some embodiments, FIG. 16 is a schematic diagram of an oscillation suppression module in the power conversion module of FIG. 5, and includes a blocking capacitor connected in series with the second power conversion circuit in order to further reduce the voltage rating requirement on the power semiconductors of the second power conversion circuit. Meanwhile, the blocking capacitor Cd blocks the DC voltage between the ends P and N, and the second power conversion circuit is controlled that the first terminal current has the same phase as the AC component of the input voltage of the oscillation suppression module, it can be considered that the second power conversion circuit is controlled to dynamically mimics a resistor at frequencies other than DC connects in series with Cd. A damping current provided by the second power conversion circuit may be an AC current at system disturbance frequency of the system not a DC current, further reducing power loss and cost of the second power conversion circuit. Therefore, in order to allow the second power conversion circuit to provide the AC current at the system disturbance frequency of the system, the schematic diagram of the second control embodiment is shown in FIG. 17. The control concept in FIG. 17 includes a second terminal voltage (VCd_dc in FIG. 16) control unit, a damping current generation unit, and an inductor current control unit, where DFF is a duty ratio feedforward, BP is a band-pass filter, and LP is a low-pass filter. Due to existence of the blocking capacitor Cd, energy absorbed by the capacitor VCd_dc cannot be sent back to the DC bus via the blocking capacitor through the DC current. As shown in FIG. 17, the second terminal voltage control unit includes a phase-locked loop (PLL) for tracking AC components of the input voltage VPN of the oscillation suppression module, and multiplying its per unit waveform to generate a current reference to control a DC capacitor voltage (VCd_dc) of the second power conversion circuit. For example, when the first power conversion circuit is connected to the DC bus formed by a six-pulse rectifier shown in FIG. 18A that connected to a three-phase AC source, the three-phase AC power source line frequency is f0, the voltage of VPN has six pulses on top of a DC voltage in one line period as shown in FIG. 8B. VPN has three significant frequency components as shown in FIG. 8C, the frequency spectrum of VPN. The control of the Cd_dc voltage may be achieved by exchanging power at harmonic frequency of the diode rectifier using AC circuit power flow theory by using the PLL to track the AC component that include, but not limited to 6th AC harmonic component, 12th AC harmonic component, 18th AC harmonic component. In this way, the absorbed damping energy by the capacitor VCd_dc is sent back to the DC bus via the AC components of the voltage VPN to ensure the balance of the DC capacitor voltage (VCd_dc) of the second power conversion circuit. In other words, the voltage control of the Cd_dc is achieved by energy exchange between the Cd_dc and the DC bus by using AC harmonics existing in AC/DC energy conversion. A damping circuit in FIG. 16 and a control method in FIG. 17 may also be applied to the circumstance where the first power conversion circuit is connected to a single-phase diode rectifier. As for the single-phase diode rectifier circuit of FIG. 19A, it has two pulses on top of a DC voltage within a line period, as shown in FIG. 19B, and first three AC significant harmonic components of a DC voltage of the single-phase diode rectifier are shown in FIG. 19C. At this time, the PLL tracks 2th AC harmonic component. FIG. 20A shows a simulation model of computer simulation based on the second control embodiment in the case of powering a constant power load through a three-phase diode rectifier. FIG. 20B is the results of simulation based on the simulation model of FIG. 20A, a voltage balance of the VCd_dc is in achieved can be seen from simulation waveforms in FIG. 20B.

Figure 21:
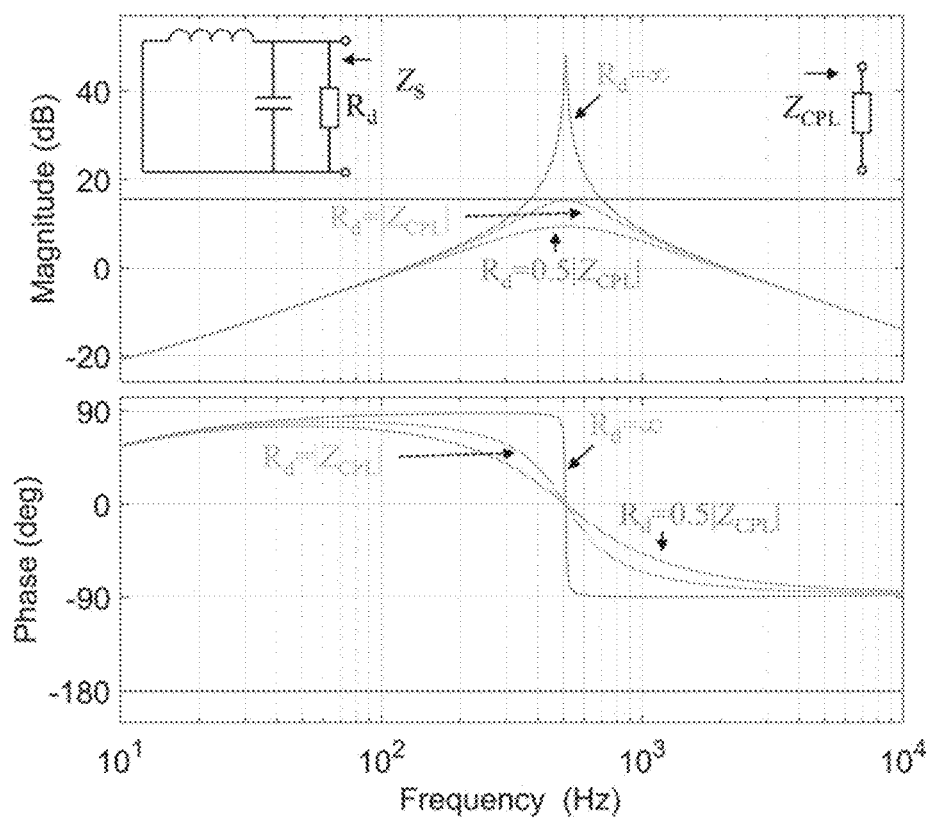
FIG. 21 shows the simulation results of damping current generated in the damping current generator according to different value of a first coefficients

In FIG. 17, the damping current generator is configured to generate a damping current in order to satisfy the stability of the operating system. The damping current generator generates a damping current according to the equivalent input impedance ZL of the constant power load (CPL) and the input terminal voltage VPN of the oscillation suppression module. A low-pass filter is performed to filter a load current flowing through the input terminal of the oscillation suppression module and the input voltage VPN of the oscillation suppression module to obtain a parameter for reflecting a DC resistor of the CPL. The cutoff frequency of the low-pass filter settled as 100 Hz, but the present disclosure is not limited thereto. The parameter for reflecting the DC resistor is scaled through the first coefficient K. In order to ensure the second power conversion circuit to produce sufficient damping, the first coefficient may equal to 0.5, but the present disclosure is not limited thereto. The simulation results when the first coefficient is equal to 0.5 are shown in FIG. 21.

Figure 22A:
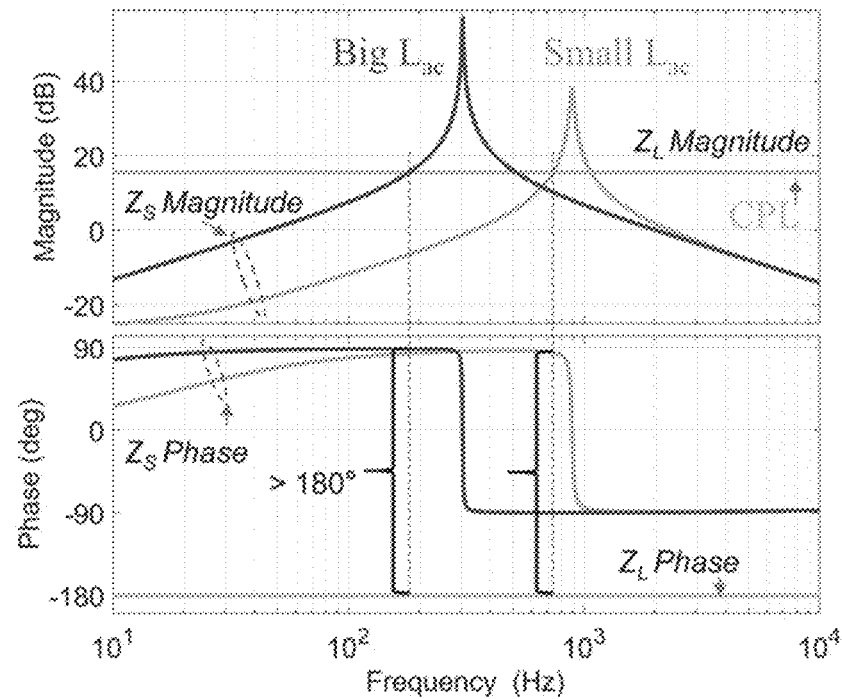
FIGS. 22A to 22B are simulation diagrams of optimizing the damping current.
Figure 22B:
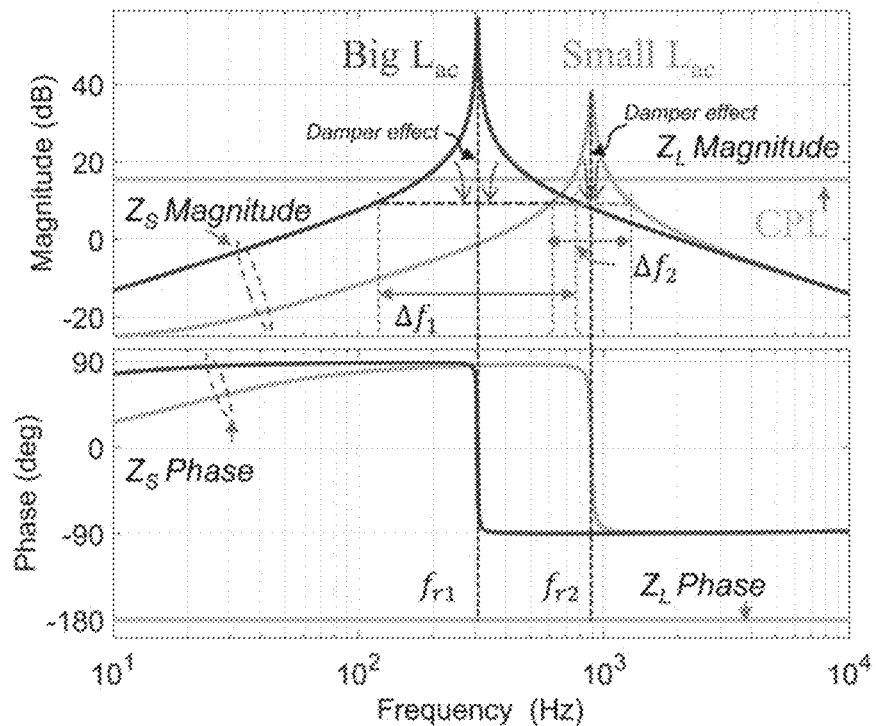
Figure 23:
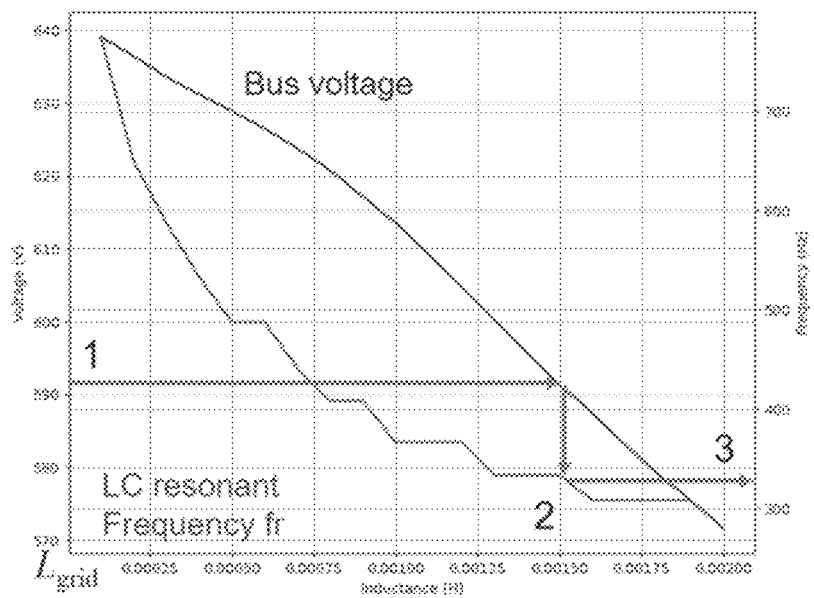
FIG. 23 is a relation diagram between the DC bus voltage and a rectifier output impedance resonant frequency.

Further, in even some embodiments, the damping current may be optimized by regulating the first coefficient K. Based on stability analysis on the impedance, a desired frequency of the damping current provided by the second power conversion circuit depends on a frequency range where the source side equivalent impedance ZS and a load side equivalent impedance ZL intersect. As shown in FIG. 22A, when the source side inductance increase, the output impedance of the rectifier shows a LC parallel resonance with smaller resonant frequency, the required damping ripple frequency reduces with a wider required frequency range. As can be known from FIG. 22B, the frequency range corresponding to the damping current shall be within a frequency range where an amplitude of the resonant frequency of the source side impedance ZS is greater than an amplitude of a frequency of the load impedance ZL. Therefore, when the constant first coefficient K is used, for example, when K=0.5, the damping current generation unit gives more damping current than what is needed since it will inject all the frequency components higher than lowpass filter cutoff frequency (100 Hz in FIG. 17) of VPN. In order to adaptively adjust frequency components of the damping current injected by the second power conversion circuit with different grid inductance, the first coefficient K may be adaptively modified to regulate the source side equivalent impedance ZS according to the desired frequency range. Since the load current and the DC bus capacitor may be preset, when the load current and a capacitance of the DC bus capacitor known information to the CPL converter, a rectifier output impedance resonant frequency may be obtained according to an average value of the DC bus voltage, as shown in FIG. 23. When a source side inductance is increased, an output voltage (the bus voltage in FIG. 23) of the rectifier is reduced. According to the DC bus voltage, the capacitance of the DC bus capacitor and the load current, LC parallel resonance frequencies (such as, fr1 and fr2 in FIG. 22B, and fr in FIG. 23) are obtained, thereby obtaining desired frequency components of the damping current, i.e., the corresponding frequency range of the sampled VPN. In this way, the damping current can be minimized, such that power of the second power conversion circuit and efficiency of the overall system are optimized.

In FIG. 17, the inductor current control unit is configured to generate a current reference for controlling a current flows through the third inductor of the second power conversion circuit according to current references generated by the second terminal voltage control unit and the damping current generation unit, and further generate a duty ratio control signal that controls the action of the second power conversion circuit.

Figure 24:
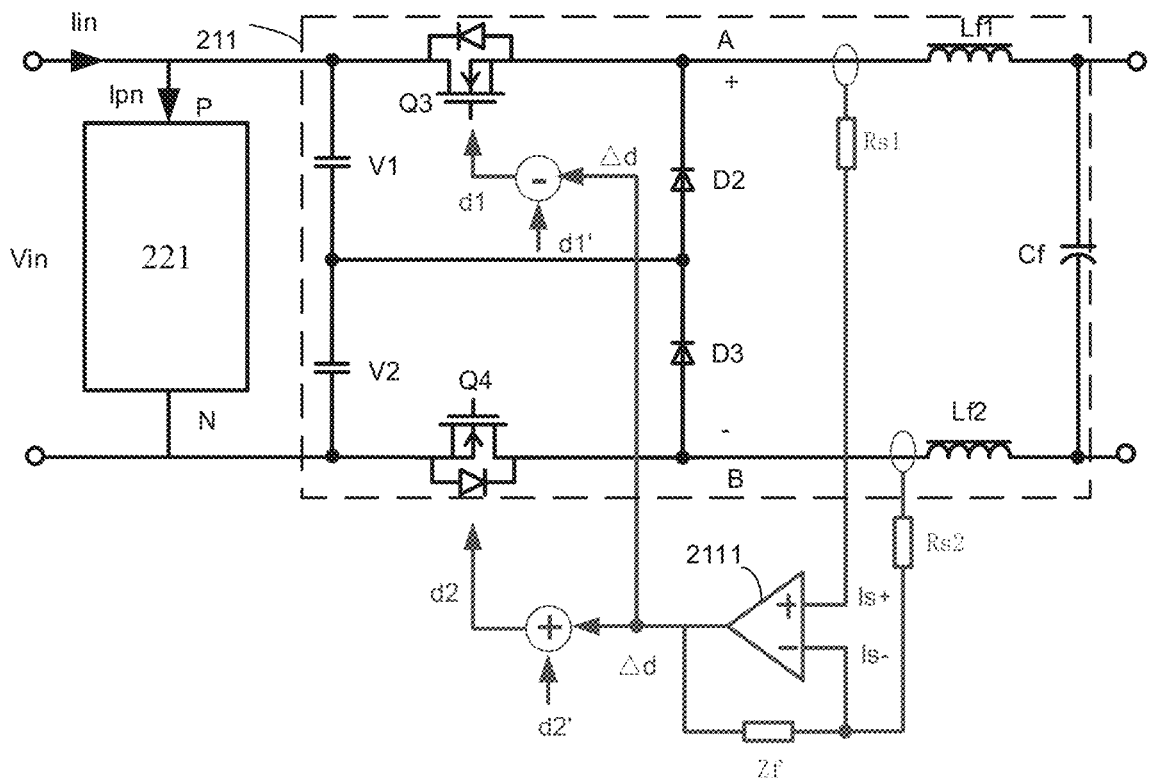
FIG. 24 is a structural diagram of a second controller in one embodiment of the present disclosure.

When the non-isolated DC/DC power conversion circuit 20 is, such as, a three-level BUCK conversion circuit shown in FIG. 3B, the first inductor Lf1 and the second inductor Lf2 are arranged on positive and negative buses of the output terminal, such that when the non-isolated DC/DC power conversion circuit 20 works, currents flow on positive output end and negative output end are substantially equal. When the voltage on the second capacitor V1 and the voltage on the third capacitor V2 are different, the third switch Q3 and the fourth switch Q4 with different characteristics, their turn-on times are inconsistent, and currents flow through the positive output end and negative output end have a large difference, thus cause the phenomenon of current circulation, thereby affecting the effect of controlling the current circulation. Therefore, in another embodiment, as shown in FIG. 24, the non-isolated DC/DC power converter 20 includes a second controller configured to control the first power conversion circuit 211. The second controller includes a current control unit 2111, which obtains a first duty ratio variation Δd according to a difference between a current Is+ at a first output end A and a current Is− at a second output end B of the first power conversion circuit 211, and the second controller regulates a first duty ratio d1' of the third switch Q3 according to the first duty ratio variation Δd to obtain a duty ratio d1, and regulates a second duty ratio d2' of the fourth switch Q4 according to the first duty ratio variation Δd to obtain a duty ratio d2. The currents flowing through the positive and negative output buses tend to be equal by controlling turn-on time of Q3 and Q4 on the basis of a main control loop of the first power conversion circuit, for example, if the turn-on time of Q3 is long, and the turn-on time of Q4 is short, causing that Is+ is greater than Is− (the current difference flows through the positive output end and the negative output end in a circulation way), and the control loop will produce a minor duty ratio variation Δd. The Δd is superposed on the duty ratio of the main control loop. finally, the duty ratio of Q3 is decreased, while the duty ratio of Q4 is increased.

Figure 25:
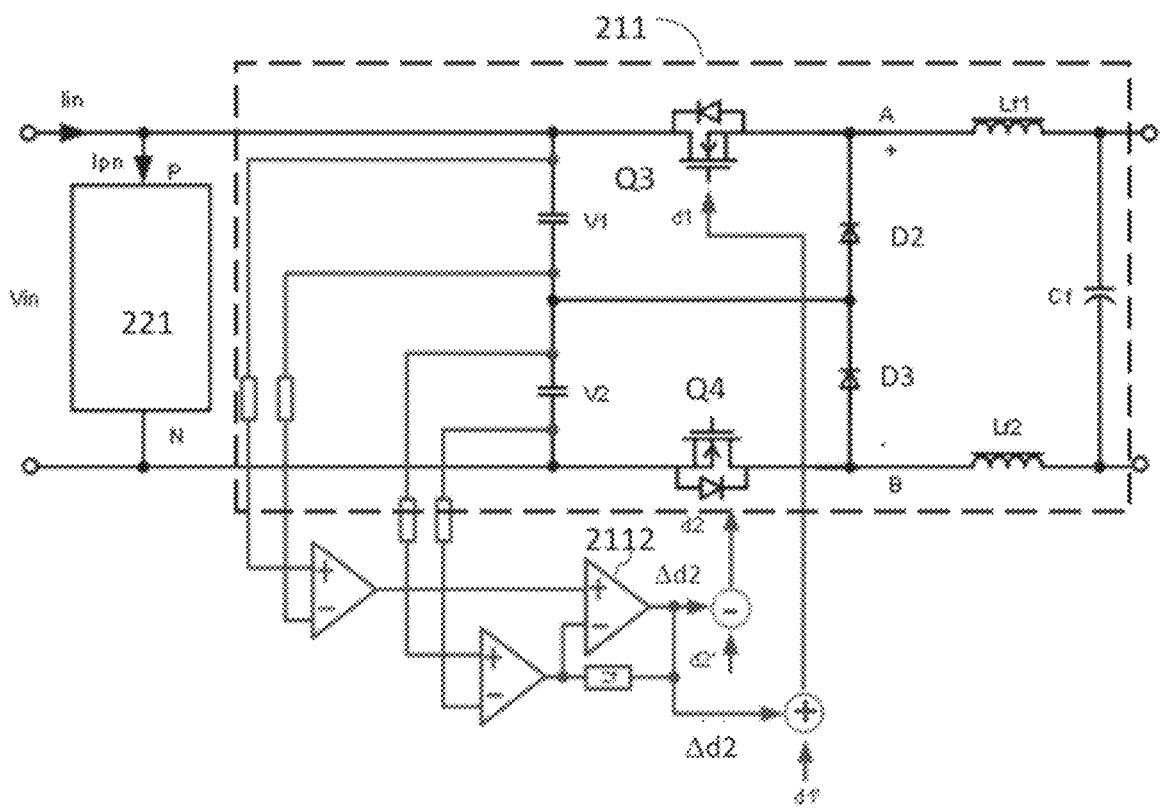
FIG. 25 is a structural diagram of a second controller in another embodiment of the present disclosure.

In even another embodiment, as shown in FIG. 25, in order to balance the voltages of the second capacitor V1 and the third capacitor V2 of the first power conversion circuit 211, the second controller includes a voltage control unit 2112, which obtains a second duty ratio variation Δd2 according to a difference between the voltage of the second capacitor V1 and the voltage of the third capacitor V2, the second controller regulates the first duty ratio d1' of the third switch Q3 according to the second duty ratio variation Δd2 to obtain a duty ratio d1, and regulates the second duty ratio d2' of the fourth switch Q4 according to the second duty ratio variation to obtain a duty ratio d2, and the voltages of the second capacitor V1 and the third capacitor V2 are balanced by fine adjustment to the duty ratios of the third switch Q3 and the fourth switch Q4 according to the detected voltage difference of the second capacitor V1 and the third capacitor V2 on the basis of the main control loop of the first power conversion circuit.

Sampling of the voltages of the second capacitor V1 and the third capacitor V2 enables differential sampling of the voltages of the second capacitor V1 and the third capacitor V2, and in addition to analog control, fine adjustment to the duty ratios of the third switch Q3 and the fourth switch Q4 according to the voltage difference of the second capacitor V1 and the third capacitor V2 also may be achieved using digital control, so as to achieve balance of the voltages on the second capacitor V1 and the third capacitor V2. When using digital control, voltage sampling may be performed in such way that one path detects a total voltage, and another path detects a capacitor voltage on one side, and the voltage difference of the second capacitor V1 and the third capacitor V2 is obtained by calculation.

Figure 26:
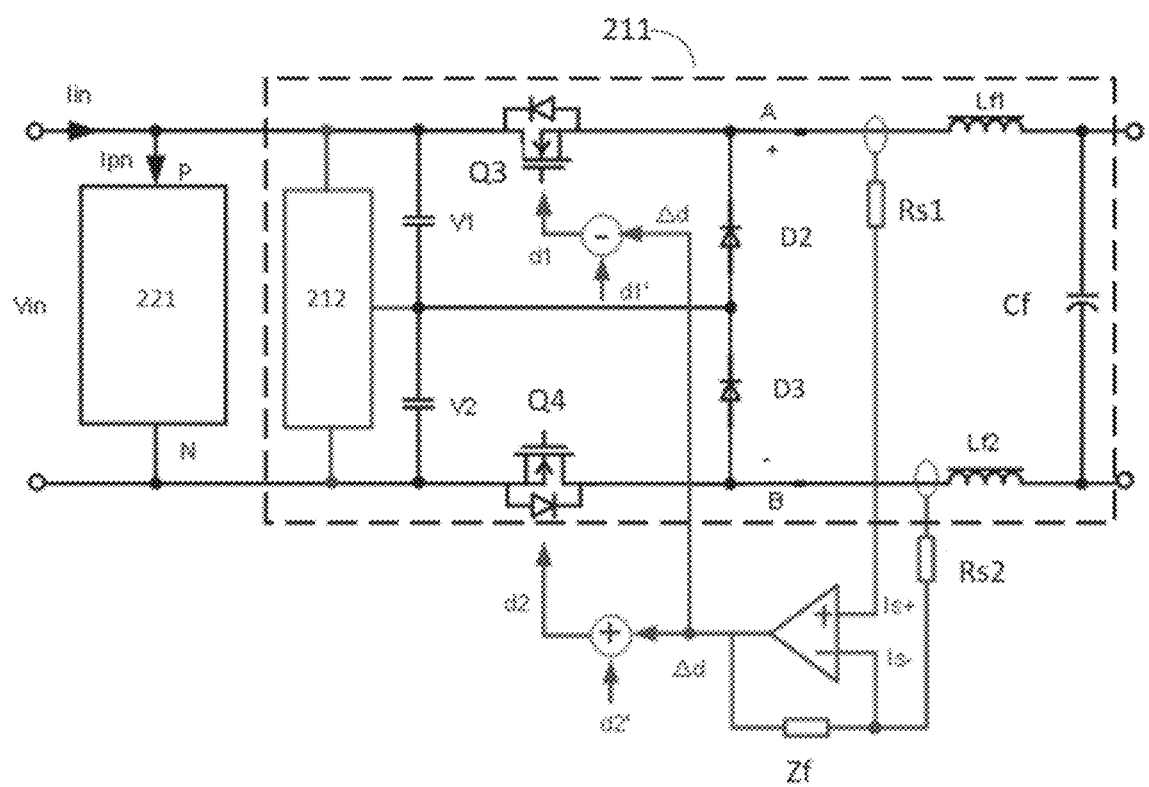
FIG. 26 is a structural diagram of a non-isolated DC/DC power converter in one embodiment of the present disclosure.

In even another embodiment of the present disclosure, as shown in FIG. 26, the difference from FIG. 25 is that the first power conversion circuit 211 further includes a second bidirectional DC/DC circuit 212 having an first terminal and an second terminal connected in parallel to the second capacitor V1 and the third capacitor V3 for balancing voltages on the upper and lower buses.

The non-isolated DC/DC power converter provided in the present disclosure overcomes current oscillation due to input or load fluctuation when the first conversion circuit represents as a constant power load by arranging a second power conversion circuit as a damper. The second power conversion circuit is connected in parallel to a first terminal of the first power conversion circuit, and the second power conversion circuit is controlled to mimic resistance characteristic. The currents flows through the positive and negative buses of the second terminal of the first power conversion circuit by arranging inductors on the positive and negative buses, thereby reducing current circulation between the parallel modules, which each module having the first conversion circuit. Operating characteristic of the first power conversion circuit is further optimized by adding current-sharing control and voltage-sharing control on the main control circuit of the first power conversion circuit, when the switching devices in the first conversion circuit having different characteristics. Further, input voltage-balancing of the first power conversion circuit also may be achieved by a bi-directional power conversion circuit, i.e., a bi-directional power conversion circuit is independent of the original voltage loop and the current loop, such that design of the voltage and current control loops is simplified. As compared to the power converter with two-stage conversion circuit, the non-isolated DC/DC power converter is high efficiency and low cost, especially applicable to the medium voltage input DC power system of the data center or driving of an AC motor.

Figure 27:
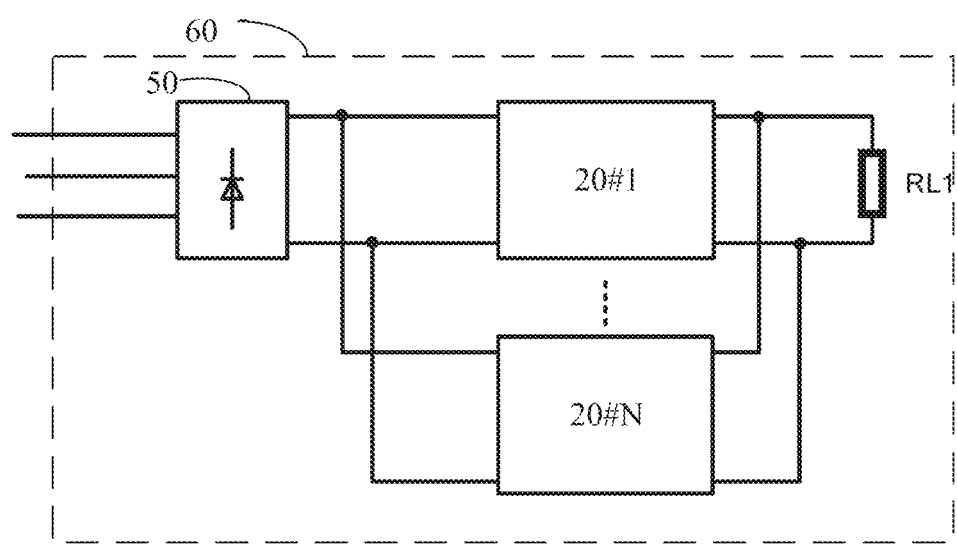
FIG. 27 is a structure of a power conversion unit according to the present disclosure.

As shown in FIG. 27, it shows a structure of a power conversion module 60 according to the present disclosure. The power conversion module 60 includes N non-isolated DC/DC power converters 20 (20 #1 to 20 #N) and a rectifying unit 50, input terminals of the N non-isolated DC/DC power converters 20 are connected to the rectifying unit 50, and output terminals of the N non-isolated DC/DC power converters 20 are connected in parallel, where N is an integer, which is greater than or equal to 1. Each power conversion module 60 may be applied to a modular power conversion device. Each power conversion module 60 including a rectifier and at least one non-isolated DC/DC power converter sequentially connected to the rectifier. The rectifying unit 50 in the rectifier may be structured as any one of rectification circuits. The non-isolated DC/DC converter circuits include, but are not limited to, any of the above embodiments.

Figure 28:
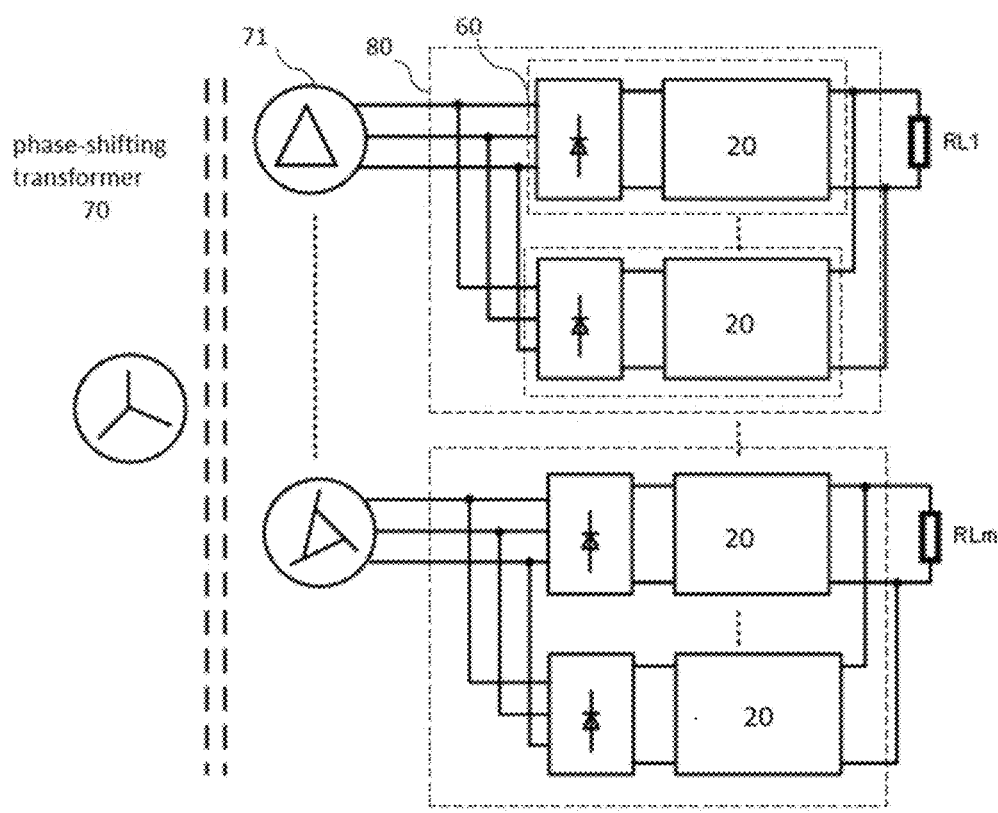
FIG. 28 is a structure of a medium voltage input DC power system according to the present disclosure.

As shown in FIG. 28, it shows a structure of a medium voltage input DC power system 100 according to the present disclosure. The medium voltage input DC power system 100 includes a phase-shifting transformer 70 including a plurality of secondary windings 71, and a plurality of power conversion units 80, each secondary winding 71 is connected to the corresponding one power conversion unit 80, each power conversion unit 80 includes a plurality of power conversion modules 60 of FIG. 13, and the number of power conversion modules 60 in each power conversion unit 80 may be the same or different. In this embodiment, taking N=1 for example, each power conversion module 60 may include a rectifying unit 50, and a non-isolated DC/DC power converter 20 connected to an output terminal of the rectifying unit 50 as shown in FIG. 27. In each power conversion unit 80, input terminals of the plurality of power conversion modules 60 are connected in parallel, and output terminals of the plurality of power conversion modules 60 are connected in parallel to power a load RLn, where n is greater than or equal to 1, and less than or equal to m. Each non-isolated DC/DC power converter 20 includes the first power conversion circuit 211 and the second power conversion circuit 221 of the present disclosure, the first power conversion circuit 211 and the second power conversion circuit 221 form a DC conversion unit, the first power conversion circuit 211 is a single-stage DC conversion circuit, and the second power conversion circuit 221 is connected in parallel to an input terminal of the first power conversion circuit 211 to suppress current oscillation at the input terminal of the first power conversion circuit 211.

Figure 29:
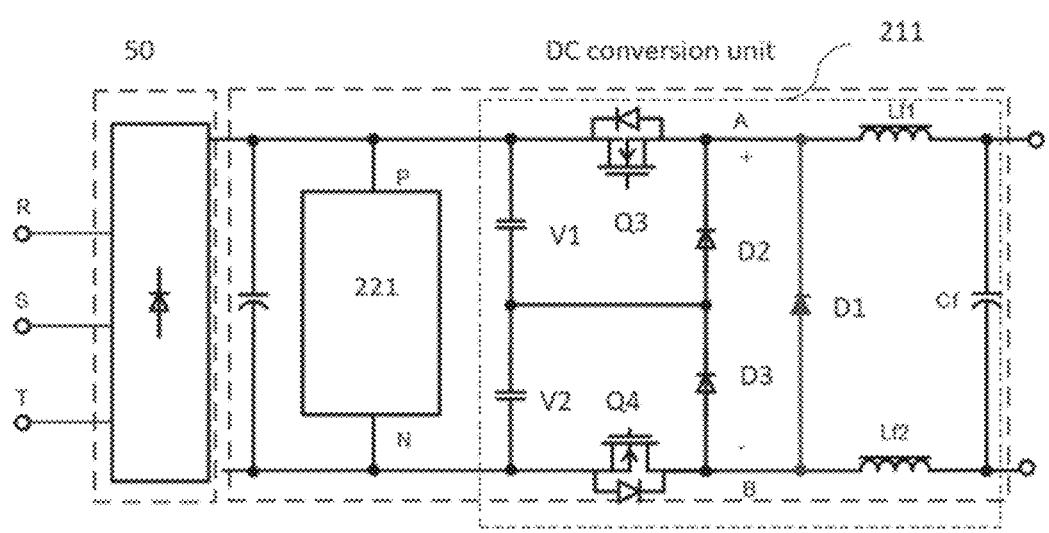
FIG. 29 is a structure of a DC conversion unit in one embodiment of the present disclosure.

Referring to FIG. 29, FIG. 29 shows a structure of the DC conversion unit. An output terminal of the first power conversion circuit 211 includes a first inductor Lf1, a second inductor Lf2 and an output capacitor Cf, a first end of the first inductor Lf1 and a first end of the second inductor Lf2 are connected in series to a first output end A and a second output end B of the first power conversion circuit 211, respectively, and the two ends of the output capacitor Cf is connected to a second end of the first inductor Lf1 and a second end of the second inductor Lf2.

As shown in FIG. 29, the first power conversion circuit 211 may further include a first diode D1, the anode of D1 connects to the first end of the first inductor Lf1 and the cathode of D1 connects to the first end of the second inductor Lf2.

Figure 30:
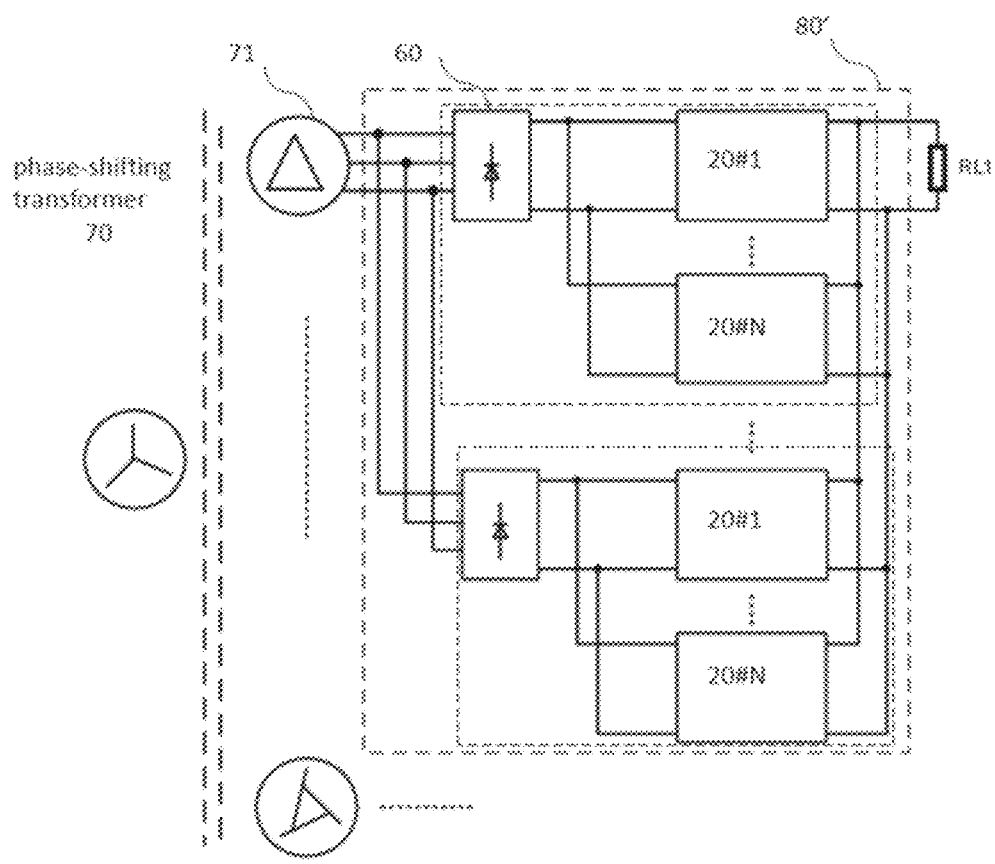
FIG. 30 is a structure of a medium voltage input DC power system according to the present disclosure.

As shown in FIG. 30, it shows a structure of a medium voltage input DC power system 200 according to the present disclosure. The medium voltage input DC power system 200 includes a phase-shifting transformer 70 including a plurality of secondary windings 71, and a plurality of power conversion units 80', each secondary winding 71 is connected to the corresponding one power conversion unit 80', each power conversion unit 80' includes a plurality of power conversion modules 60 of FIG. 13, and each power conversion module 60 may include a rectifying unit 50 and N non-isolated DC/DC power converters 20 (20 #1 to 20 #N) as shown in FIG. 27, where N is greater than 1. The N non-isolated DC/DC power converters 20 are connected to an output terminal of the rectifying unit 50, respectively, and output terminals of the N non-isolated DC/DC power converters 20 are connected in parallel. In each power conversion unit 80', output terminals are connected in parallel to power one load through parallel connection of input terminals of the plurality of power conversion modules 60. Each non-isolated DC/DC power converter 20 includes the first power conversion circuit 211 and the second power conversion circuit 221 of the present disclosure, the first power conversion circuit 211 and the second power conversion circuit 221 form a DC conversion unit, and a structure of the DC conversion unit is shown in FIG. 15. The first power conversion circuit 211 is a single-stage DC conversion circuit, and the second power conversion circuit 221 is connected in parallel to an input terminal of the first power conversion circuit 211 to suppress current oscillation at the input terminal of the first power conversion circuit 211.

Figure 31:
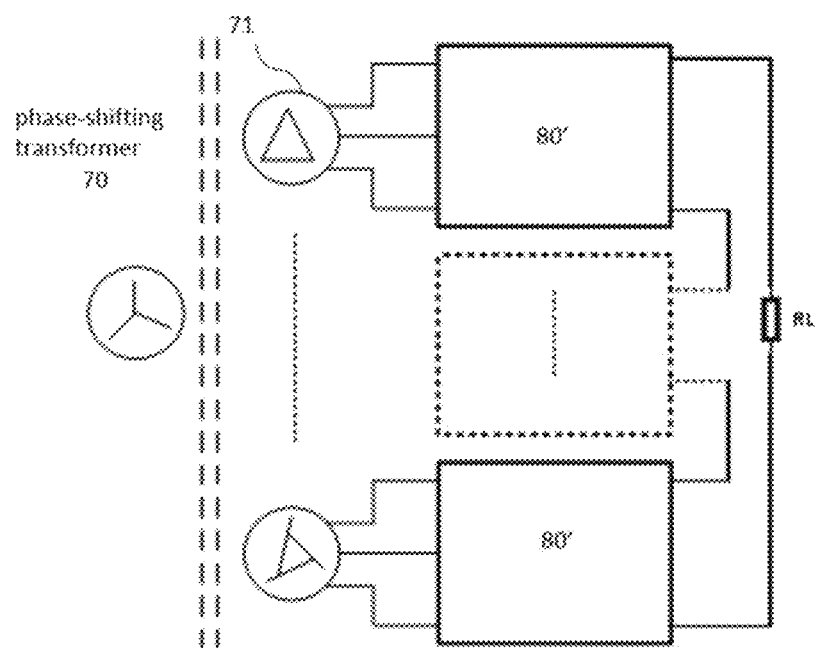
FIG. 31 is a structure of a medium voltage input DC power system according to the present disclosure.

As shown in FIG. 31, it shows a structure of a medium voltage input DC power system 300 according to the present disclosure. The medium voltage input DC power system 300 includes a phase-shifting transformer 70 including a plurality of secondary windings 71, and a plurality of power conversion units 80', each secondary winding 71 is connected to the corresponding one power conversion unit 80', and the medium voltage input DC power system 300 differs from the medium voltage input DC power system 200 in that output terminals of the plurality of power conversion units 80' are connected in series to power a load RL. Since an output voltage is improved to be applied to the load with a high voltage and a large power after outputs of the plurality of power conversion modules are connected in series, it is possible to power the load with a high voltage using a low voltage power supply.

Figure 32:
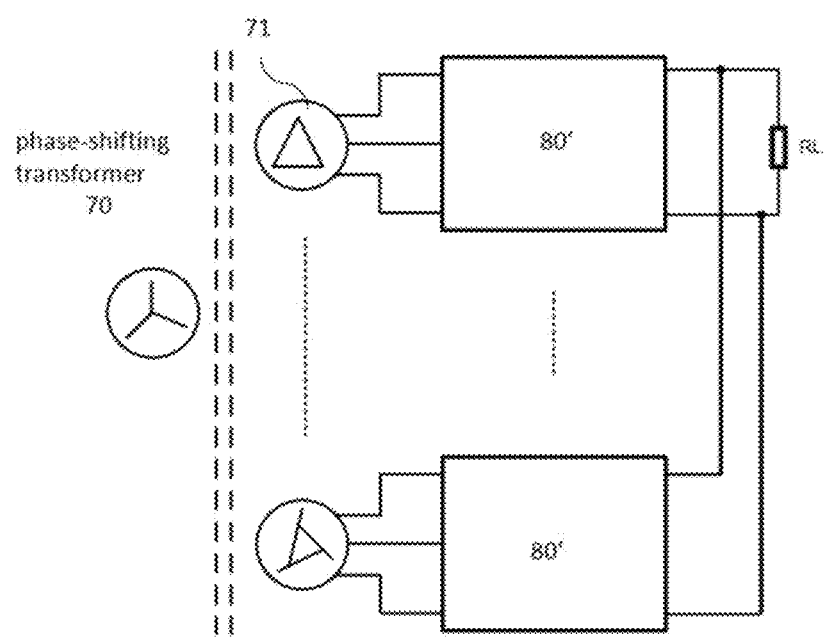
FIG. 32 is a structure of a medium voltage input DC power system according to the present disclosure.

As shown in FIG. 32, it shows a structure of a medium voltage input DC power system 400 according to the present disclosure. The medium voltage input DC power system 400 includes a phase-shifting transformer 70 including a plurality of secondary windings 71, and a plurality of power conversion units 80', each secondary winding 71 is connected to the corresponding one power conversion unit 80', and the medium voltage input DC power system 400 differs from the medium voltage input DC power system 200 in that output terminals of the plurality of power conversion units 80' are connected in parallel to power a load RL, such that the module with a small current powers the load with a large current.

Figure 33:
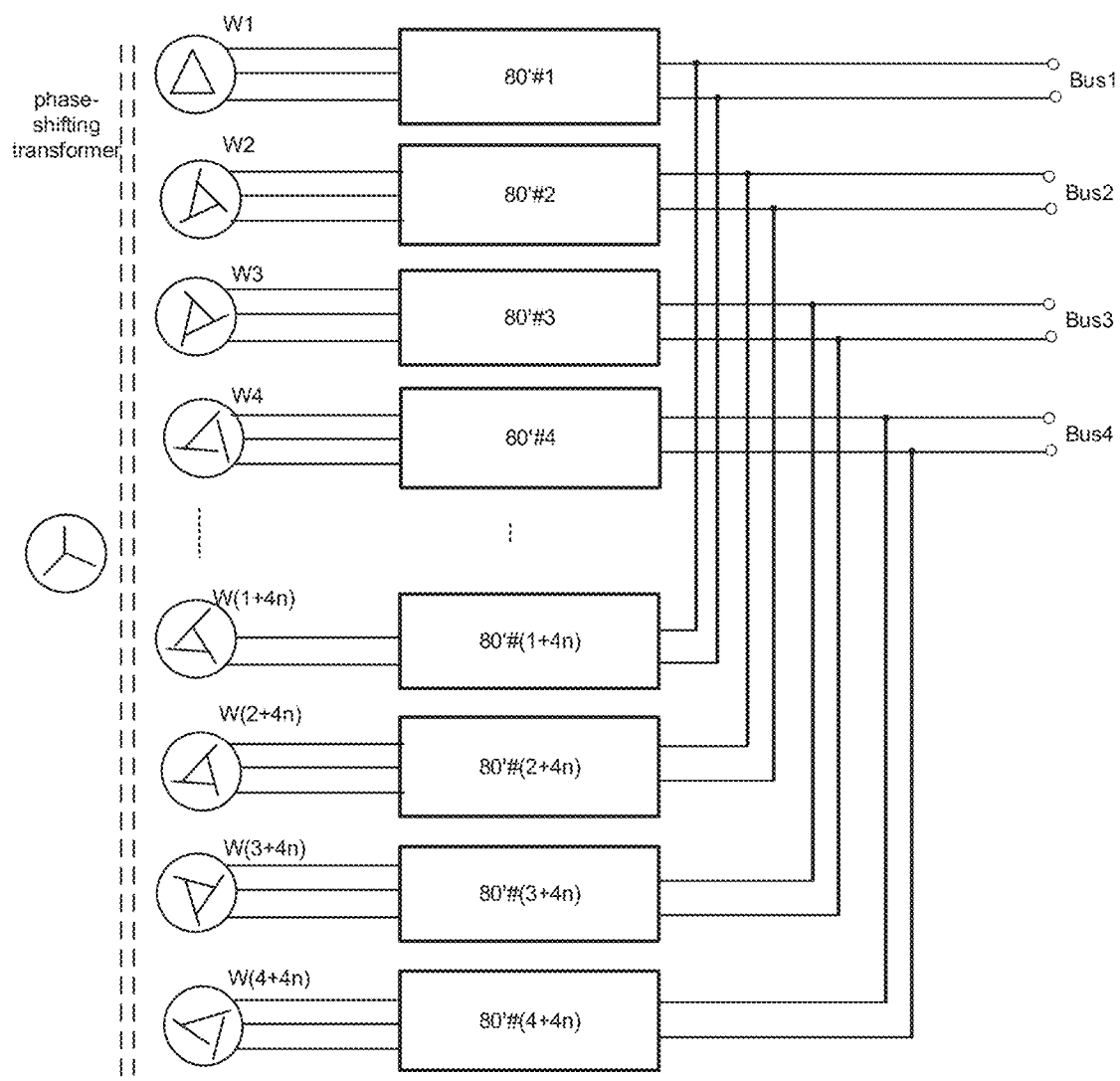
FIG. 33 is a structure of a medium voltage input DC power system according to the present disclosure.

As shown in FIG. 33, it shows a structure of a medium voltage input DC power system 500 according to the present disclosure. A phase-shifting transformer of the medium voltage input DC power system 500 includes 4+4n secondary windings (W1, W2, .... W (4+4n)), where n is greater than or equal to 0, and voltage phases outputted from the 4+4n secondary windings sequentially differ by a phase-shifting angle. Each secondary winding is connected to one power conversion unit 80', the power conversion unit 80' corresponding to each secondary winding has an output terminal, and there are total 4+4n output terminals. In this embodiment, the 4+4n output terminals are divided into four groups based on a first arrangement order, and each group of output terminals are connected in parallel, respectively. A medium voltage input DC power system 600 has four groups of separate output buses corresponding to the first arrangement order, which are Bus1, Bus2, Bus3 and Bus4, the windings corresponding to Bus1 are 1, ... 1+4n (n≥0), the windings corresponding to Bus2 are 2, ... 2+4n (n≥0), the windings corresponding to Bus3 are 3 ... 3+4n (n≥0), and the windings corresponding to Bus4 are 4, ... 4+4n (n≥0)).

Further, in other embodiments, the medium voltage input DC power system 500 includes K secondary windings and K power conversion modules in one-to-one correspondence, where K≥2, voltage phases outputted from the K secondary windings sequentially differ by a phase-shifting angle, and the medium voltage input DC power system 600 includes M groups of output buses, where M≥2. The K power conversion modules are divided into L groups of output units according to a first order, each group of output units includes M power conversion modules, and output terminals of the M power conversion modules in each output unit are sequentially connected in parallel in one-to-one correspondence according to the first order to form the M groups of output buses, where L=K/M, and K is a multiple of M. Through such arrangement, it can be ensured that the phase-shifting transformer has a high input power factor when power of the output bus is unbalanced.

Figure 34:
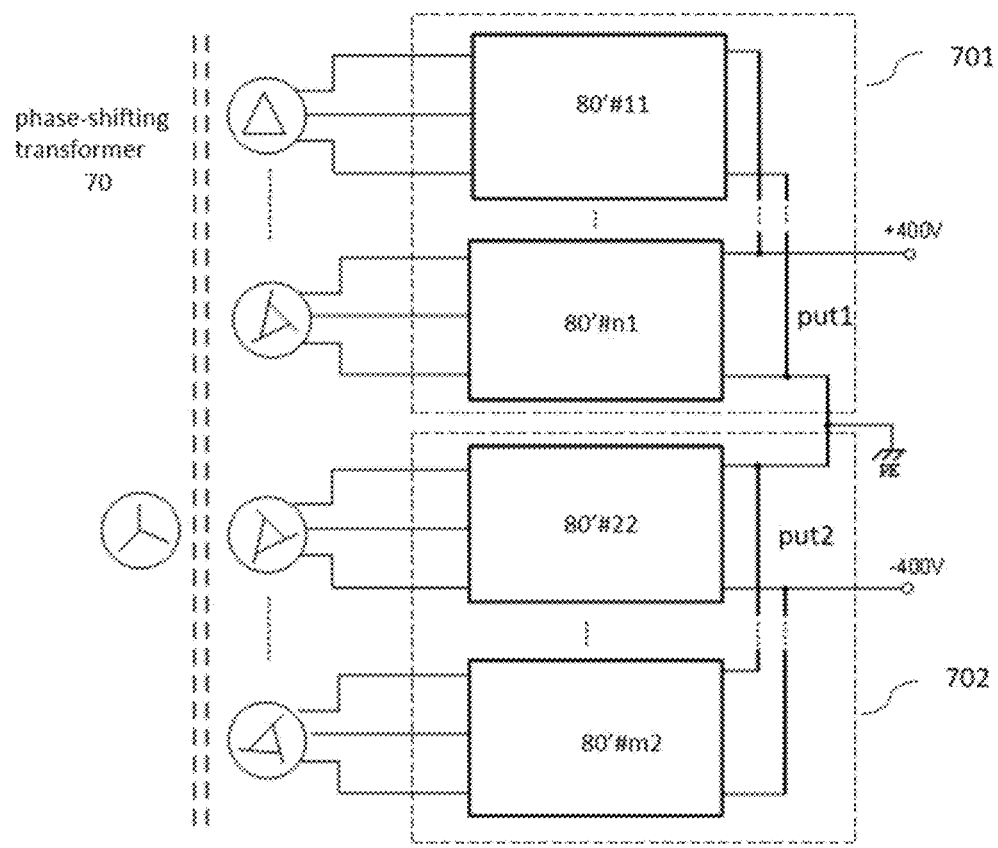
FIG. 34 is a structure of a medium voltage input DC power system according to the present disclosure.

As shown in FIG. 34, it shows a structure of a medium voltage input DC power system 600 according to the present disclosure. The medium voltage input DC power system 600 includes a first output unit 701 including I secondary windings and I power conversion modules (80' #11 to 80' #n1) in one-to-one correspondence, output terminals of the I power conversion modules connected in parallel, and a second output unit 702 including J secondary windings and J power conversion modules (80' #22 to 80' #m2) in one-to-one correspondence, output terminals of the J power conversion modules connected in parallel, where I≥2 and J≥2, and an output terminal put1 of the first output unit is connected in series to an output terminal put2 of the second output unit. Further, a connection point of the output terminal put1 of the first output unit 701 and the output terminal put2 of the second output unit 702 is grounded. When the connection point of system architecture of the medium voltage input DC power system 600 is grounded, a safety distance from positive and negative to ground at the modules can be shortened while reducing the requirement withstand voltage of a safety capacitor. For example, the power system may form an output of +/−270V or +/−400V voltage and may be applied to a charging pile for charging batteries at different voltage grades. In other embodiments, the series connection point may not be grounded. The connection ways of outputs of the power conversion modules is not thereto limited. The present disclosure does not limit the number of the power modules in a power system and sequence of modules in series or parallel connections.

The phase-shifting angle between the secondary windings of the phase-shifting transformer in the embodiments of the present disclosure may be equal, and also may be different. The connection of the primary and secondary windings of the transformer are triangular or Y-shaped windings is also not limited. The rectifier in the power conversion modules may be diode rectifier, and also may be rectifier with switching devices such as thyristors.

The medium voltage input DC power system of the present disclosure uses the power conversion unit with a single-stage architecture, and gives different connection schemes of the DC power system consisting of the power conversion unit to be suitable for more different voltage application scenarios, thereby reducing cost of the system while improving efficiency and reliability of the system.

Although the embodiments of the present disclosure have been illustrated and described, as for those ordinary in the art, it can be understood that these embodiments can have various changes, modifications, replacements and variations without departing from principle and spirit of the present disclosure, and the protection scope of the present disclosure is determined by the scope defined by the appended claims.

What is claimed is:

1. A non-isolated DC/DC power converter, comprising:
    a power module comprising a first power conversion circuit, the first power conversion circuit being a non-isolated DC/DC conversion circuit, a first output end of the first power conversion circuit is connected with a first inductor, and a second output end of the first power conversion circuit is connected with a second inductor; and
    an oscillation suppression module comprising a second power conversion circuit, a first terminal of the second power conversion circuit coupled in parallel to an input terminal of the first power conversion circuit, a first terminal current of the second power conversion circuit being in phase with at least partial of AC components of an input voltage of the oscillation suppression module to suppress oscillation of an input current of the first power conversion circuit, and the second power conversion circuit being a bidirectional DC/DC conversion circuit,
    the second power conversion circuit comprises:
    a third inductor, a first switch and a second switch, the first switch and the second switch connected in series, and having a node therebetween;
    wherein the third inductor is connected between the node and a first end of the first terminal of the second power conversion circuit,
    the non-isolated DC/DC power converter further comprises a first controller, the first controller comprises a voltage loop regulator, a current loop regulator and a damping current generator;
    the voltage loop regulator outputting a first reference current according to a second terminal voltage and a first reference voltage of the second power conversion circuit;
    the damping current generator outputting a second reference current according to at least partial of AC components of the input voltage of the oscillation suppression module, and a first coefficient;
    outputting a third reference current according to the first reference current and the second reference current;
    the current loop regulator outputting a driving signal according to a third inductor current and the third reference current of the second power conversion circuit; and
    regulating a duty ratio of the first switch and the second switch according to the driving signal respectively.

2. The non-isolated DC/DC power converter according to claim 1, wherein the damping current generator outputting a second reference current according to at least partial of AC components of the input voltage of the oscillation suppression module, an output power of the first power conversion circuit, and the first coefficient.

* * * * *